United States Patent
Goyal et al.

(10) Patent No.: US 12,056,473 B2
(45) Date of Patent: Aug. 6, 2024

(54) LOW-CODE / NO-CODE LAYER FOR INTERACTIVE APPLICATION DEVELOPMENT

(71) Applicant: ServiceNow, Inc., Santa Clara, CA (US)

(72) Inventors: Gaurav Goyal, Santa Clara, CA (US); Chaitanya Saragadam, Hyderabad (IN); Mohammed Furqan, Hyderabad (IN); Pradeep Kumar Gouribhatla, Hyderabad (IN); Rahul Bharadwaj, Hyderabad (IN); Avishek Dalal, Hyderabad (IN)

(73) Assignee: ServiceNow, Inc., Santa Clara, CA (US)

( * ) Notice: Subject to any disclaimer, the term of this patent is extended or adjusted under 35 U.S.C. 154(b) by 9 days.

(21) Appl. No.: 17/878,642

(22) Filed: Aug. 1, 2022

(65) Prior Publication Data
US 2024/0036835 A1     Feb. 1, 2024

(51) Int. Cl.
*G06F 40/186*     (2020.01)
*G06F 3/0482*     (2013.01)
(Continued)

(52) U.S. Cl.
CPC .............. *G06F 8/38* (2013.01); *G06F 3/0482* (2013.01); *G06F 3/0484* (2013.01); *G06F 9/451* (2018.02);
(Continued)

(58) Field of Classification Search
CPC .......... G06F 8/38; G06F 9/451; G06F 3/0482; G06F 3/0484; G06F 40/186;
(Continued)

(56) References Cited

U.S. PATENT DOCUMENTS 4,941,084 A    7/1990   Terada et al.
5,185,860 A    2/1993   Wu
(Continued)

FOREIGN PATENT DOCUMENTS

EP    0433979     6/1991
EP    1607824     12/2005
(Continued)

OTHER PUBLICATIONS

Xuyong Yang et al., Automatic Generation of Visual-Textual Presentation Layout, Feb. 2016, [Retrieved on Apr. 11, 2024]. Retrieved from the internet: <URL: https://dl.acm.org/doi/pdf/10.1145/2818709> 33 Pages (1-33) (Year: 2016).*

(Continued)

*Primary Examiner* — Anibal Rivera
(74) *Attorney, Agent, or Firm* — McDonnell Boehnen Hulbert & Berghoff LLP

(57) ABSTRACT

A system includes persistent storage containing predefined user interface (UI) component templates and a representation of a web page that includes a runtime UI component configured to reserve an empty portion of the web page to be populated by UI components generated at runtime. The system also includes a processor configured to perform operations, including receiving, from a client device, a request for the web page, and determining, based on the request, that the web page includes the runtime UI component. The operations also include determining runtime parameter values associated with the request, and determining, based on the runtime parameter values and the predefined UI component templates, context-specific UI components to populate the empty portion of the web page. The operations further include generating a context-specific representation of the web page based on the context-specific UI (Continued)

components, and transmitting, to the client device, the context-specific representation.

20 Claims, 11 Drawing Sheets

(51) Int. Cl.
  *G06F 3/0484* (2022.01)
  *G06F 3/0488* (2022.01)
  *G06F 8/38* (2018.01)
  *G06F 9/451* (2018.01)
  *G06F 16/958* (2019.01)
  *G06F 3/04842* (2022.01)
  *G06F 16/957* (2019.01)
  *G06F 40/106* (2020.01)

(52) U.S. Cl.
  CPC ........ *G06F 3/04842* (2013.01); *G06F 16/957* (2019.01); *G06F 16/9577* (2019.01); *G06F 16/958* (2019.01); *G06F 40/106* (2020.01); *G06F 40/186* (2020.01)

(58) Field of Classification Search
  CPC .. G06F 40/106; G06F 16/957; G06F 16/9577; G06F 16/958
  See application file for complete search history.

(56) References Cited

U.S. PATENT DOCUMENTS

| | | |
|---|---|---|
| 5,237,518 A | 8/1993 | Sztipanovits et al. |
| 5,261,097 A | 11/1993 | Saxon |
| 5,265,252 A | 11/1993 | Rawson, III et al. |
| 5,367,685 A | 11/1994 | Gosling |
| 5,390,297 A | 2/1995 | Barber et al. |
| 5,442,791 A | 8/1995 | Wrabetz et al. |
| 5,452,415 A | 9/1995 | Hotka |
| 5,522,042 A | 5/1996 | Fee et al. |
| 5,533,116 A | 7/1996 | Vesterinen |
| 5,655,081 A | 8/1997 | Bonnell et al. |
| 5,659,736 A | 8/1997 | Hasegawa et al. |
| 5,671,412 A | 9/1997 | Christiano |
| 5,696,701 A | 12/1997 | Burgess et al. |
| 5,715,463 A | 2/1998 | Merkin |
| 5,745,879 A | 4/1998 | Wyman |
| 5,761,502 A | 6/1998 | Jacobs |
| 5,764,913 A | 6/1998 | Jancke et al. |
| 5,887,139 A | 3/1999 | Madison, Jr. et al. |
| 5,909,217 A | 6/1999 | Bereiter |
| 5,937,165 A | 8/1999 | Schwaller et al. |
| 5,949,976 A | 9/1999 | Chappelle |
| 5,978,594 A | 11/1999 | Bonnell et al. |
| 6,021,437 A | 2/2000 | Chen et al. |
| 6,041,347 A | 3/2000 | Harsham et al. |
| 6,088,717 A | 7/2000 | Reed et al. |
| 6,101,500 A | 8/2000 | Lau |
| 6,128,016 A | 10/2000 | Coelho et al. |
| 6,131,118 A | 10/2000 | Stupek, Jr. et al. |
| 6,134,581 A | 10/2000 | Ismael et al. |
| 6,138,122 A | 10/2000 | Smith et al. |
| 6,148,335 A | 11/2000 | Haggard et al. |
| 6,166,732 A | 12/2000 | Mitchell et al. |
| 6,167,448 A | 12/2000 | Hemphill et al. |
| 6,175,866 B1 | 1/2001 | Holloway et al. |
| 6,175,878 B1 | 1/2001 | Seaman et al. |
| 6,260,050 B1 | 7/2001 | Yost et al. |
| 6,263,457 B1 | 7/2001 | Anderson et al. |
| 6,272,150 B1 | 8/2001 | Hrastar et al. |
| 6,336,138 B1 | 1/2002 | Caswell et al. |
| 6,363,421 B2 | 3/2002 | Barker et al. |
| 6,393,386 B1 | 5/2002 | Zager et al. |
| 6,397,245 B1 | 5/2002 | Johnson, II et al. |
| 6,434,626 B1 | 8/2002 | Prakash et al. |
| 6,438,592 B1 | 8/2002 | Killian |
| 6,456,306 B1 | 9/2002 | Chin et al. |
| 6,466,932 B1 | 10/2002 | Dennis et al. |
| 6,487,590 B1 | 11/2002 | Foley et al. |
| 6,505,248 B1 | 1/2003 | Casper et al. |
| 6,526,442 B1 | 2/2003 | Stupek, Jr. et al. |
| 6,621,823 B1 | 9/2003 | Mellquist et al. |
| 6,707,795 B1 | 3/2004 | Noorhosseini et al. |
| 6,742,015 B1 | 5/2004 | Bowman-Amuah |
| 6,763,380 B1 | 7/2004 | Mayton et al. |
| 6,816,898 B1 | 11/2004 | Scarpelli et al. |
| 6,895,586 B1 | 5/2005 | Brasher et al. |
| 6,948,175 B1 | 9/2005 | Fong et al. |
| 6,954,904 B2 | 10/2005 | White |
| 6,985,901 B1 | 1/2006 | Sachse et al. |
| 7,003,564 B2 | 2/2006 | Greuel et al. |
| 7,028,228 B1 | 4/2006 | Lovy et al. |
| 7,043,537 B1 | 5/2006 | Pratt |
| 7,043,661 B2 | 5/2006 | Valadarsky et al. |
| 7,062,683 B2 | 6/2006 | Warpenburg et al. |
| 7,096,459 B2 | 8/2006 | Keller et al. |
| 7,146,574 B2 | 12/2006 | Goldthwaite et al. |
| 7,168,035 B1 | 1/2007 | Bell et al. |
| 7,197,466 B1 | 3/2007 | Peterson et al. |
| 7,215,360 B2 | 5/2007 | Gupta |
| 7,216,304 B1 | 5/2007 | Gourdol et al. |
| 7,222,147 B1 | 5/2007 | Black et al. |
| 7,281,170 B2 | 10/2007 | Taylor et al. |
| 7,412,502 B2 | 8/2008 | Fearn et al. |
| 7,505,872 B2 | 3/2009 | Keller et al. |
| 7,555,707 B1 | 6/2009 | Labarge et al. |
| 7,593,013 B2 | 9/2009 | Agutter et al. |
| 7,596,716 B2 | 9/2009 | Frost et al. |
| 7,617,073 B2 | 11/2009 | Trinon et al. |
| 7,660,731 B2 | 2/2010 | Chaddha et al. |
| 7,676,294 B2 | 3/2010 | Baier et al. |
| 7,676,437 B2 | 3/2010 | Satkunanathan et al. |
| 7,840,490 B1 | 11/2010 | Sellers et al. |
| 7,877,783 B1 | 1/2011 | Cline et al. |
| 7,890,869 B1 | 2/2011 | Mayer et al. |
| 7,966,398 B2 | 6/2011 | Wiles, Jr. |
| 8,060,396 B1 | 11/2011 | Bessler et al. |
| 8,196,210 B2 | 6/2012 | Sterin |
| 8,321,948 B2 | 11/2012 | Robinson et al. |
| 8,407,669 B2 | 3/2013 | Yee et al. |
| 8,458,605 B2 | 6/2013 | Klask et al. |
| 8,554,750 B2 | 10/2013 | Rangarajan et al. |
| 8,595,647 B2 | 11/2013 | Sabin et al. |
| 8,620,818 B2 | 12/2013 | Hughes et al. |
| 8,646,093 B2 | 2/2014 | Myers et al. |
| 8,674,992 B2 | 3/2014 | Poston et al. |
| 8,725,647 B2 | 5/2014 | Disciascio et al. |
| 8,762,870 B2 | 6/2014 | Robotham et al. |
| 9,053,460 B2 | 6/2015 | Gilbert et al. |
| 9,098,555 B2 | 8/2015 | Bjork et al. |
| 10,079,730 B2 | 9/2018 | Subramanian et al. |
| 11,301,271 B1 | 4/2022 | Fedayev et al. |
| 2002/0059204 A1 | 5/2002 | Harris |
| 2002/0116340 A1 | 8/2002 | Hellberg et al. |
| 2002/0133584 A1 | 9/2002 | Greuel et al. |
| 2002/0158969 A1 | 10/2002 | Gupta |
| 2003/0014442 A1* | 1/2003 | Shiigi ................. G06F 8/20 715/255 |
| 2003/0118087 A1 | 6/2003 | Goldthwaite et al. |
| 2003/0200293 A1 | 10/2003 | Fearn et al. |
| 2005/0015217 A1 | 1/2005 | Weidl et al. |
| 2005/0091356 A1 | 4/2005 | Izzo |
| 2006/0026453 A1 | 2/2006 | Frost et al. |
| 2006/0075352 A1 | 4/2006 | Burke et al. |
| 2006/0095461 A1 | 5/2006 | Raymond |
| 2006/0179058 A1 | 8/2006 | Bram et al. |
| 2006/0293942 A1 | 12/2006 | Chaddha et al. |
| 2007/0033279 A1 | 2/2007 | Battat et al. |
| 2007/0079236 A1* | 4/2007 | Schrier ............... G06F 40/114 715/209 |
| 2007/0188494 A1 | 8/2007 | Agutter et al. |
| 2007/0288389 A1 | 12/2007 | Vaughan et al. |
| 2008/0037900 A1* | 2/2008 | Elgar ................ G06Q 20/3555 382/276 |

(56) References Cited

U.S. PATENT DOCUMENTS

| | | |
|---|---|---|
| 2008/0133289 A1 | 6/2008 | Armour et al. |
| 2008/0148253 A1 | 6/2008 | Badwe et al. |
| 2008/0189683 A1 | 8/2008 | Payette et al. |
| 2008/0319779 A1 | 12/2008 | Hughes et al. |
| 2009/0088875 A1 | 4/2009 | Baier et al. |
| 2009/0228984 A1 | 9/2009 | Sterin |
| 2010/0110932 A1 | 5/2010 | Doran et al. |
| 2010/0211467 A1* | 8/2010 | Ramanathan ......... G06F 16/957 705/14.72 |
| 2010/0318538 A1 | 12/2010 | Wyman et al. |
| 2011/0289484 A1 | 11/2011 | Caine et al. |
| 2012/0016706 A1 | 1/2012 | Pargaonkar et al. |
| 2012/0290959 A1 | 11/2012 | Quine |
| 2014/0282218 A1* | 9/2014 | Kaufman ............... G06F 40/103 715/781 |
| 2015/0012513 A1 | 1/2015 | Ou |
| 2015/0106751 A1* | 4/2015 | Farjo .................... G06F 16/972 715/760 |
| 2016/0125011 A1 | 5/2016 | Petschulat et al. |
| 2017/0032554 A1* | 2/2017 | O'Donovan .......... G06F 3/0488 |
| 2017/0371504 A1 | 12/2017 | Sharma et al. |
| 2018/0365873 A1 | 12/2018 | Prophete |
| 2021/0149992 A1* | 5/2021 | Nam ..................... G06F 40/169 |
| 2022/0374591 A1* | 11/2022 | Al Salami ............. G06F 40/143 |

FOREIGN PATENT DOCUMENTS

| | | |
|---|---|---|
| WO | WO 99/34285 | 7/1999 |
| WO | WO 00/52559 | 9/2000 |
| WO | WO 01/79970 | 10/2001 |

OTHER PUBLICATIONS

Aliaksei Miniukovich et al., Visual Complexity of Graphical User Interfaces, May 29-Jun. 1, 2018, [Retrieved on Apr. 11, 2024]. Retrieved from the internet: <URL: https://dl.acm.org/doi/pdf/10.1145/3206505.3206549> 9 Pages (1-9) (Year: 2018).*

United States Patent & Trademark Office, Non-Final Office Action issued Oct. 7, 2022, issued in connection wiht U.S. Appl. No. 17/521,588, filed Nov. 8, 2021, 14 pages.

Wilson et al., U.S. Appl. No. 17/521,588, filed Nov. 8, 2021.

"Everything you need to know about empty state design," Justinmind, https://www.justinmind.com/blog/everything-you-need-to-know-about-empty-state-design/, Jul. 12, 2018.

"Powerful website building features to help you publish anything, anywhere." Website Builder Features—Explore Features WordPress.com, https://wordpress.com/features/, printed from the World Wide Web Jul. 27, 2022.

"Service Portal," ServiceNow, Service Portal—Front-End Portal Framework—ServiceNow, https://www.service.now.com/products/service-portal.html, printed from the World Wide Web Jul. 27, 2022.

"Drupal—Open Source CMS / Drupal.org," https://www.drupal.org/, printed from the World Wide Web Jul. 27, 2022.

"The Flexible Platform Empowering Website Creators," Joomla!, https://www.joomla.org/, printed from the World Wide Web Jul. 27, 2022.

* cited by examiner

LOW-CODE / NO-CODE LAYER FOR INTERACTIVE APPLICATION DEVELOPMENT

BACKGROUND

Developing a web page may involve familiarity and/or experience with using hypertext markup language (HTML), JAVASCRIPT®, and/or other web development technologies. Thus, individuals unfamiliar with such technologies might be unable to develop web pages without first learning to use the requisite programming languages and associated development systems. Additionally, even for individuals familiar with such technologies, the web page development process may take a significant amount of time, especially when a different web page is developed from scratch for each new use case. Further, web pages developed by different programmers may lack consistency (e.g., visually and/or behaviorally) with one another, thus creating inconsistent user experiences within groups of related web pages.

SUMMARY

Development of a web page may be facilitated by including, in the web page, a runtime UI component that adds dynamic runtime behavior to the web page. The runtime UI component may reserve an empty portion of the web page to be populated by UI components generated at runtime. While static UI components of the web page may remain the same or similar across different requests for the web page, the UI components generated to populate the empty portion of the web page may be context-specific and may thus vary across the different requests for the web page.

These context-specific UI components may be generated based on parameter values associated with a specific request for the web page. The parameter values may identify attributes of a user requesting the web page (resulting in user-specific UI components), attributes of a client device requesting the web page (resulting in device-specific UI components), and/or attributes of a server generating the web page (resulting in server-specific UI components).

Runtime behavior of the runtime UI component may be defined by configuring modifiable portions of metadata that defines the runtime UI component. The modifiable portions of the metadata may be configurable using a runtime UI component editor that (i) displays and allows for editing of the modifiable portions of the metadata and (ii) hides and prevents editing of non-modifiable portions of the metadata. Thus, the runtime UI component editor may allow users to experiment with different behaviors of the runtime UI component without concern for misconfiguring and/or breaking the web page. The runtime UI component may be reused across different web pages, either with the same metadata (resulting in the same or similar runtime behavior across different web pages) or different metadata (resulting in page-specific runtime behavior).

The runtime UI component editor may allow UI component templates to be used to define different possible combinations of context-specific UI components, hierarchies thereof, and/or behaviors thereof, each of which may depend on specific parameter values present at runtime. Specifically, a plurality of different UI component templates may be added to the runtime UI component, and each of these UI component templates may be associated with corresponding modifiable and non-modifiable metadata portions. Each respective UI component template may be defined as a parent, child, and/or sibling of other UI component templates. Additionally, the runtime appearance, runtime content, runtime behavior, and/or other runtime aspects of each respective UI component template may be conditioned on one or more runtime parameter values.

Accordingly, a first example embodiment may involve a system that includes persistent storage containing (i) a plurality of predefined UI component templates and (ii) a representation of a web page that comprises a runtime UI component configured to reserve an empty portion of the web page to be populated by UI components generated at runtime. The system may also include one or more processors configured to perform operations. The operations may include receiving, from a client device, a request for the web page, and determining, based on the request, that the web page comprises the runtime UI component. The operations may also include, based on determining that the web page comprises the runtime UI component, determining a plurality of runtime parameter values associated with the request. The operations may additionally include determining, based on the plurality of runtime parameter values and the plurality of predefined UI component templates, one or more context-specific UI components to populate the empty portion of the web page reserved by the runtime UI component. The operations may further include generating a context-specific representation of the web page based on the one or more context-specific UI components, and transmitting, to the client device, a response comprising the context-specific representation of the web page.

A second example embodiment may involve receiving, from a client device, a request for a web page. A representation of the web page may be stored in persistent storage and may comprise a runtime UI component configured to reserve an empty portion of the web page to be populated by UI components generated at runtime. The second example embodiments may also involve determining, based on the request, that the web page comprises the runtime UI component and, based on determining that the web page comprises the runtime UI component, determining a plurality of runtime parameter values associated with the request. The second example embodiments may additionally involve determining, based on the plurality of runtime parameter values and a plurality of predefined UI component templates stored in the persistent storage, one or more context-specific UI components to populate the empty portion of the web page reserved by the runtime UI component. The second example embodiments may further involve generating a context-specific representation of the web page based on the one or more context-specific UI components, and transmitting, to the client device, a response comprising the context-specific representation of the web page.

In a third example embodiment, an article of manufacture may include a non-transitory computer-readable medium, having stored thereon program instructions that, upon execution by a computing system, cause the computing system to perform operations in accordance with the first and/or second example embodiment.

In a fourth example embodiment, a computing system may include at least one processor, as well as memory and program instructions. The program instructions may be stored in the memory, and upon execution by the at least one processor, cause the computing system to perform operations in accordance with the first and/or second example embodiment.

In a fifth example embodiment, a system may include various means for carrying out each of the operations of the first and/or second example embodiment.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

DETAILED DESCRIPTION

Figure 1:
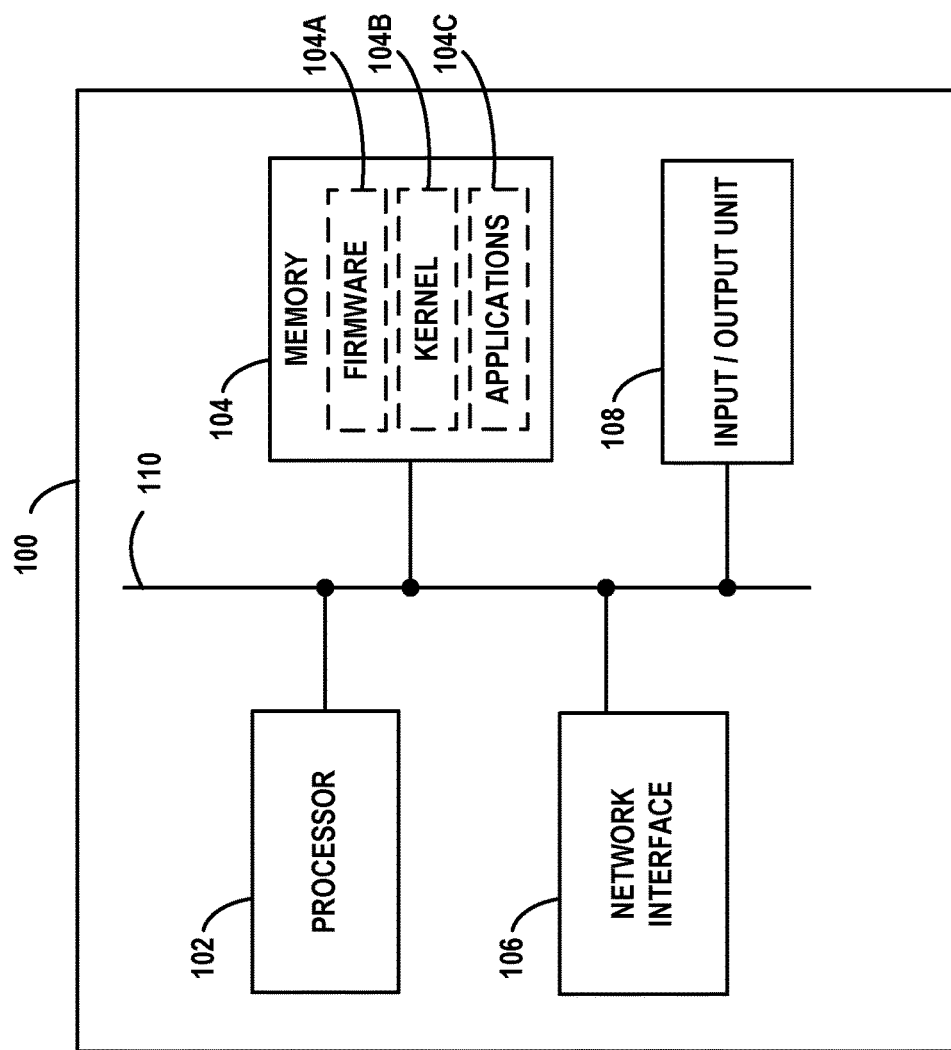
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. Introduction

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline, and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflows for IT, HR, CRM, customer service, application development, and security. Nonetheless, the embodiments herein are not limited to enterprise applications or environments, and can be more broadly applied.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, and delete (CRUD) capabilities. This allows new applications to be built on a common application infrastructure. In some cases, applications structured differently than MVC, such as those using unidirectional data flow, may be employed.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data are stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

Such an aPaaS system may represent a GUI in various ways. For example, a server device of the aPaaS system may generate a representation of a GUI using a combination of HyperText Markup Language (HTML) and JAVASCRIPT®. The JAVASCRIPT® may include client-side executable code, server-side executable code, or both. The server device may transmit or otherwise provide this representation to a client device for the client device to display on a screen according to its locally-defined look and feel. Alternatively, a representation of a GUI may take other forms, such as an intermediate form (e.g., JAVA® bytecode) that a client device can use to directly generate graphical output therefrom. Other possibilities exist.

Further, user interaction with GUI elements, such as buttons, menus, tabs, sliders, checkboxes, toggles, etc. may be referred to as "selection", "activation", or "actuation" thereof. These terms may be used regardless of whether the GUI elements are interacted with by way of keyboard, pointing device, touchscreen, or another mechanism.

An aPaaS architecture is particularly powerful when integrated with an enterprise's network and used to manage such a network. The following embodiments describe architectural and functional aspects of example aPaaS systems, as well as the features and advantages thereof.

II. Example Computing Devices And Cloud-Based Computing Environments

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and input/output unit 108, all of which may be coupled by system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and buses) of computing device 100. Applications 104C may be one or more user-space software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more computing devices like computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
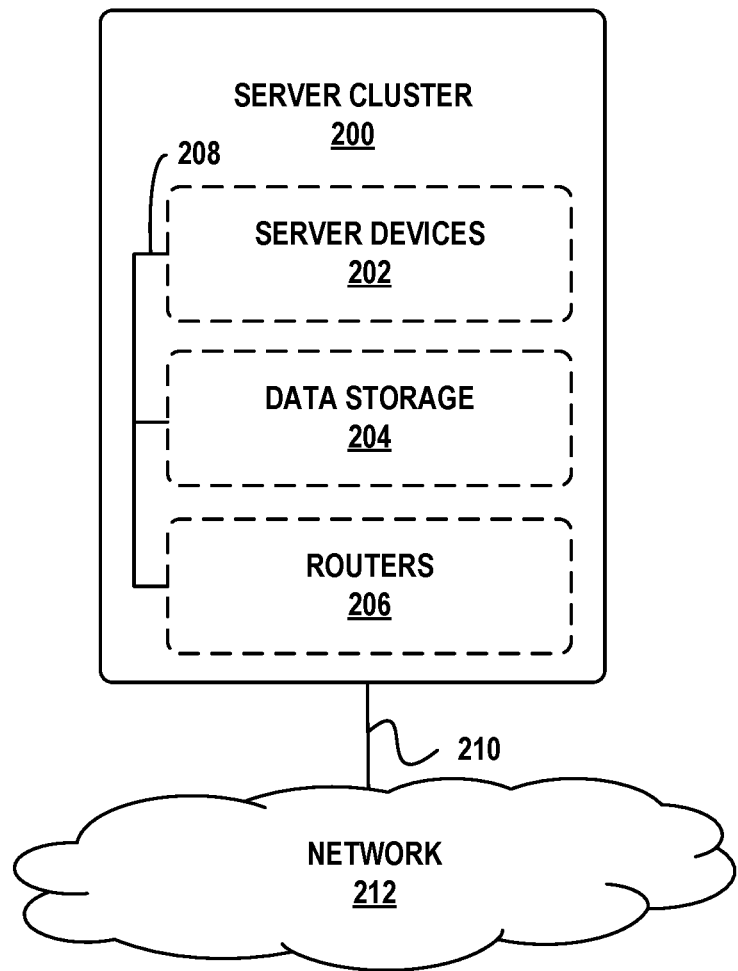
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purposes of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency, and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page or web application representations. Such a representation may take the form of a markup language, such as HTML, the eXtensible Markup Language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JAVASCRIPT®, and so on. Computer program code written in these languages may facilitate the providing of web pages to client devices, as well as client device interaction with the web pages. Alternatively or additionally, JAVA® may be used to facilitate generation of web pages and/or to provide web application functionality.

III. Example Remote Network Management Architecture

Figure 3:
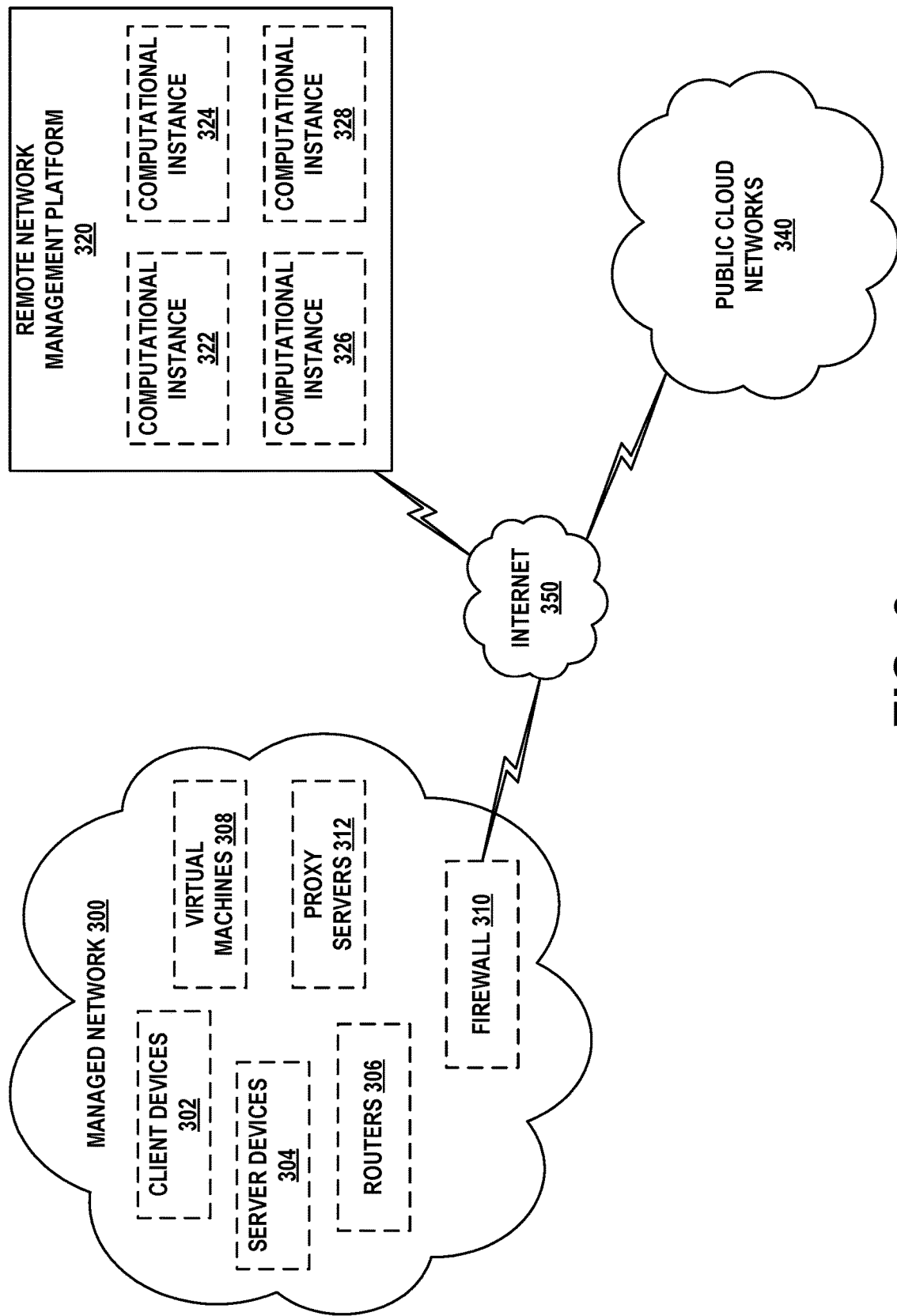
FIG. 3 depicts a remote network management architecture, in accordance with example embodiments.

FIG. 3 depicts a remote network management architecture, in accordance with example embodiments. This architecture includes three main components—managed network 300, remote network management platform 320, and public cloud networks 340—all connected by way of Internet 350.

A. Managed Networks

Managed network 300 may be, for example, an enterprise network used by an entity for computing and communications tasks, as well as storage of data. Thus, managed network 300 may include client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server application that facilitates communication and movement of data between managed network 300, remote network management platform 320, and public cloud networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components.

Possibly with the assistance of proxy servers 312, remote network management platform 320 may also be able to discover and manage aspects of public cloud networks 340 that are used by managed network 300. While not shown in FIG. 3, one or more proxy servers 312 may be placed in any of public cloud networks 340 in order to facilitate this discovery and management.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

B. Remote Network Management Platforms

Remote network management platform 320 is a hosted environment that provides aPaaS services to users, particularly to the operator of managed network 300. These services may take the form of web-based portals, for example, using the aforementioned web-based technologies. Thus, a user can securely access remote network management platform 320 from, for example, client devices 302, or potentially from a client device outside of managed network 300. By way of the web-based portals, users may design, test, and deploy applications, generate reports, view analytics, and perform other tasks. Remote network management platform 320 may also be referred to as a multi-application platform.

As shown in FIG. 3, remote network management platform 320 includes four computational instances 322, 324, 326, and 328. Each of these computational instances may represent one or more server nodes operating dedicated copies of the aPaaS software and/or one or more database nodes. The arrangement of server and database nodes on physical server devices and/or virtual machines can be flexible and may vary based on enterprise needs. In combination, these nodes may provide a set of web portals, services, and applications (e.g., a wholly-functioning aPaaS system) available to a particular enterprise. In some cases, a single enterprise may use multiple computational instances.

For example, managed network 300 may be an enterprise customer of remote network management platform 320, and may use computational instances 322, 324, and 326. The reason for providing multiple computational instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation. Any application deployed onto a computational instance may be a scoped application, in that its access to databases within the computational instance can be restricted to certain elements therein (e.g., one or more particular database tables or particular rows within one or more database tables).

For purposes of clarity, the disclosure herein refers to the arrangement of application nodes, database nodes, aPaaS software executing thereon, and underlying hardware as a "computational instance." Note that users may colloquially refer to the graphical user interfaces provided thereby as "instances." But unless it is defined otherwise herein, a "computational instance" is a computing system disposed within remote network management platform 320.

The multi-instance architecture of remote network management platform 320 is in contrast to conventional multi-tenant architectures, over which multi-instance architectures exhibit several advantages. In multi-tenant architectures, data from different customers (e.g., enterprises) are comingled in a single database. While these customers' data are separate from one another, the separation is enforced by the software that operates the single database. As a consequence, a security breach in this system may affect all customers' data, creating additional risk, especially for entities subject to governmental, healthcare, and/or financial regulation. Furthermore, any database operations that affect one customer will likely affect all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In some embodiments, remote network management platform 320 may include one or more central instances, controlled by the entity that operates this platform. Like a computational instance, a central instance may include some number of application and database nodes disposed upon some number of physical server devices or virtual machines. Such a central instance may serve as a repository for specific configurations of computational instances as well as data that can be shared amongst at least some of the computational instances. For instance, definitions of common security threats that could occur on the computational instances, software packages that are commonly discovered on the computational instances, and/or an application store for applications that can be deployed to the computational instances may reside in a central instance. Computational instances may communicate with central instances by way of well-defined interfaces in order to obtain this data.

In order to support multiple computational instances in an efficient fashion, remote network management platform 320 may implement a plurality of these instances on a single hardware platform. For example, when the aPaaS system is implemented on a server cluster such as server cluster 200, it may operate virtual machines that dedicate varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, a computational instance such as computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

C. Public Cloud Networks

Public cloud networks 340 may be remote server devices (e.g., a plurality of server clusters such as server cluster 200) that can be used for outsourced computation, data storage, communication, and service hosting operations. These servers may be virtualized (i.e., the servers may be virtual machines). Examples of public cloud networks 340 may include AMAZON WEB SERVICES® and MICROSOFT® AZURE®. Like remote network management platform 320, multiple server clusters supporting public cloud networks 340 may be deployed at geographically diverse locations for purposes of load balancing, redundancy, and/or high availability.

Managed network 300 may use one or more of public cloud networks 340 to deploy applications and services to its clients and customers. For instance, if managed network 300 provides online music streaming services, public cloud networks 340 may store the music files and provide web interface and streaming capabilities. In this way, the enterprise of managed network 300 does not have to build and maintain its own servers for these operations.

Remote network management platform 320 may include modules that integrate with public cloud networks 340 to expose virtual machines and managed services therein to managed network 300. The modules may allow users to request virtual resources, discover allocated resources, and provide flexible reporting for public cloud networks 340. In order to establish this functionality, a user from managed network 300 might first establish an account with public cloud networks 340, and request a set of associated resources. Then, the user may enter the account information into the appropriate modules of remote network management platform 320. These modules may then automatically discover the manageable resources in the account, and also provide reports related to usage, performance, and billing.

D. Communication Support and Other Operations

Internet 350 may represent a portion of the global Internet. However, Internet 350 may alternatively represent a different type of network, such as a private wide-area or local-area packet-switched network.

Figure 4:
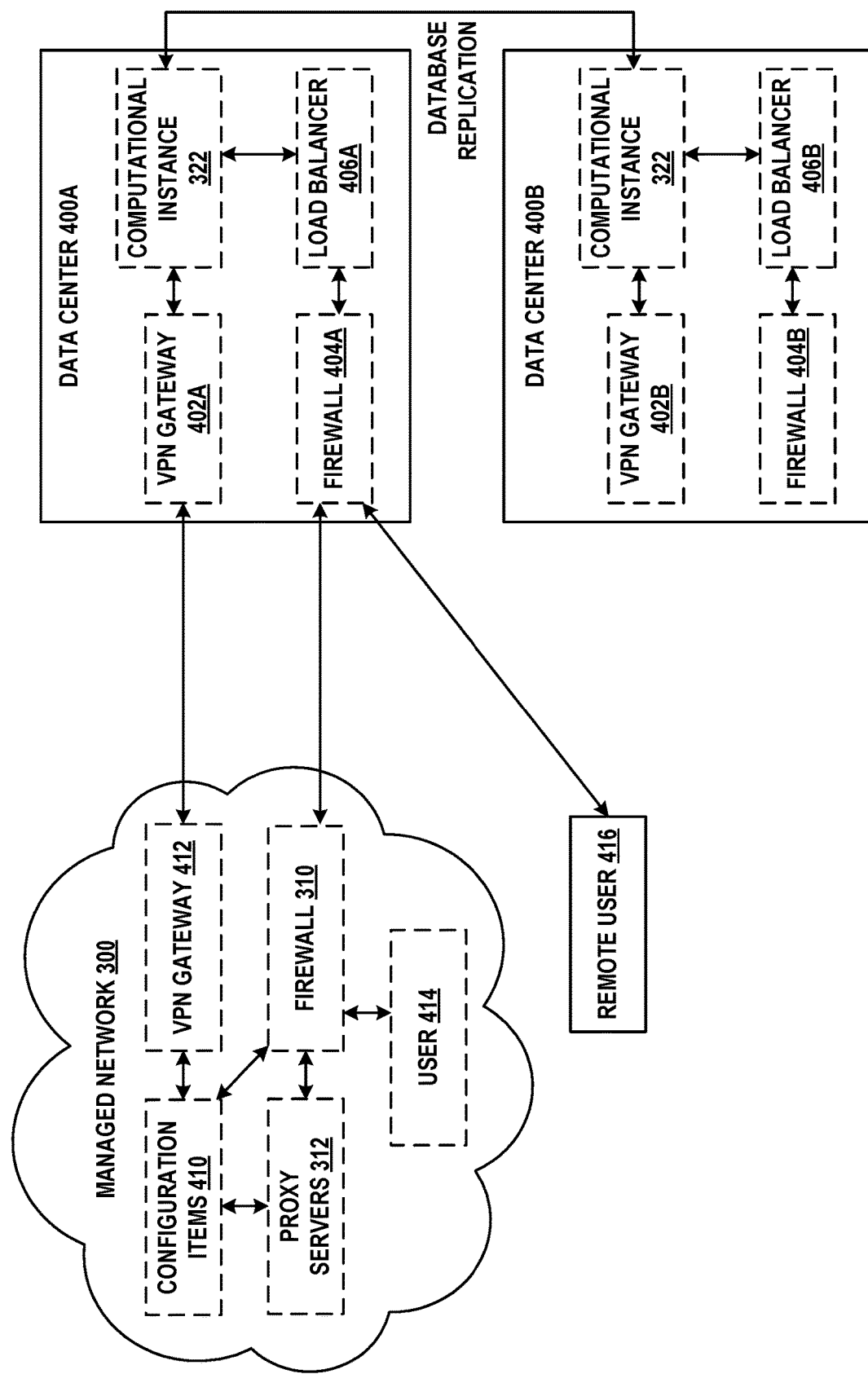
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated, in whole or in part, across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any components thereof, any applications or services executing thereon, as well as relationships between devices, components, applications, and services. Thus, the term "configuration items" may be shorthand for part of all of any physical or virtual device, or any application or service remotely discoverable or managed by computational instance 322, or relationships between discovered devices, applications, and services. Configuration items may be represented in a configuration management database (CMDB) of computational instance 322.

As stored or transmitted, a configuration item may be a list of attributes that characterize the hardware or software that the configuration item represents. These attributes may include manufacturer, vendor, location, owner, unique identifier, description, network address, operational status, serial number, time of last update, and so on. The class of a configuration item may determine which subset of attributes are present for the configuration item (e.g., software and hardware configuration items may have different lists of attributes).

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively). In various alternatives, devices in managed network 300, such as proxy servers 312, may use a secure protocol (e.g., TLS) to communicate directly with one or more data centers.

IV. Example Discovery

In order for remote network management platform 320 to administer the devices, applications, and services of managed network 300, remote network management platform 320 may first determine what devices are present in managed network 300, the configurations, constituent components, and operational statuses of these devices, and the applications and services provided by the devices. Remote network management platform 320 may also determine the relationships between discovered devices, their components, applications, and services. Representations of each device, component, application, and service may be referred to as a configuration item. The process of determining the configuration items and relationships within managed network 300 is referred to as discovery, and may be facilitated at least in part by proxy servers 312. Representations of configuration items and relationships are stored in a CMDB.

While this section describes discovery conducted on managed network 300, the same or similar discovery procedures may be used on public cloud networks 340. Thus, in some environments, "discovery" may refer to discovering configuration items and relationships on a managed network and/or one or more public cloud networks.

For purposes of the embodiments herein, an "application" may refer to one or more processes, threads, programs, client software modules, server software modules, or any other software that executes on a device or group of devices. A "service" may refer to a high-level capability provided by one or more applications executing on one or more devices working in conjunction with one another. For example, a web service may involve multiple web application server threads executing on one device and accessing information from a database application that executes on another device.

Figure 5:
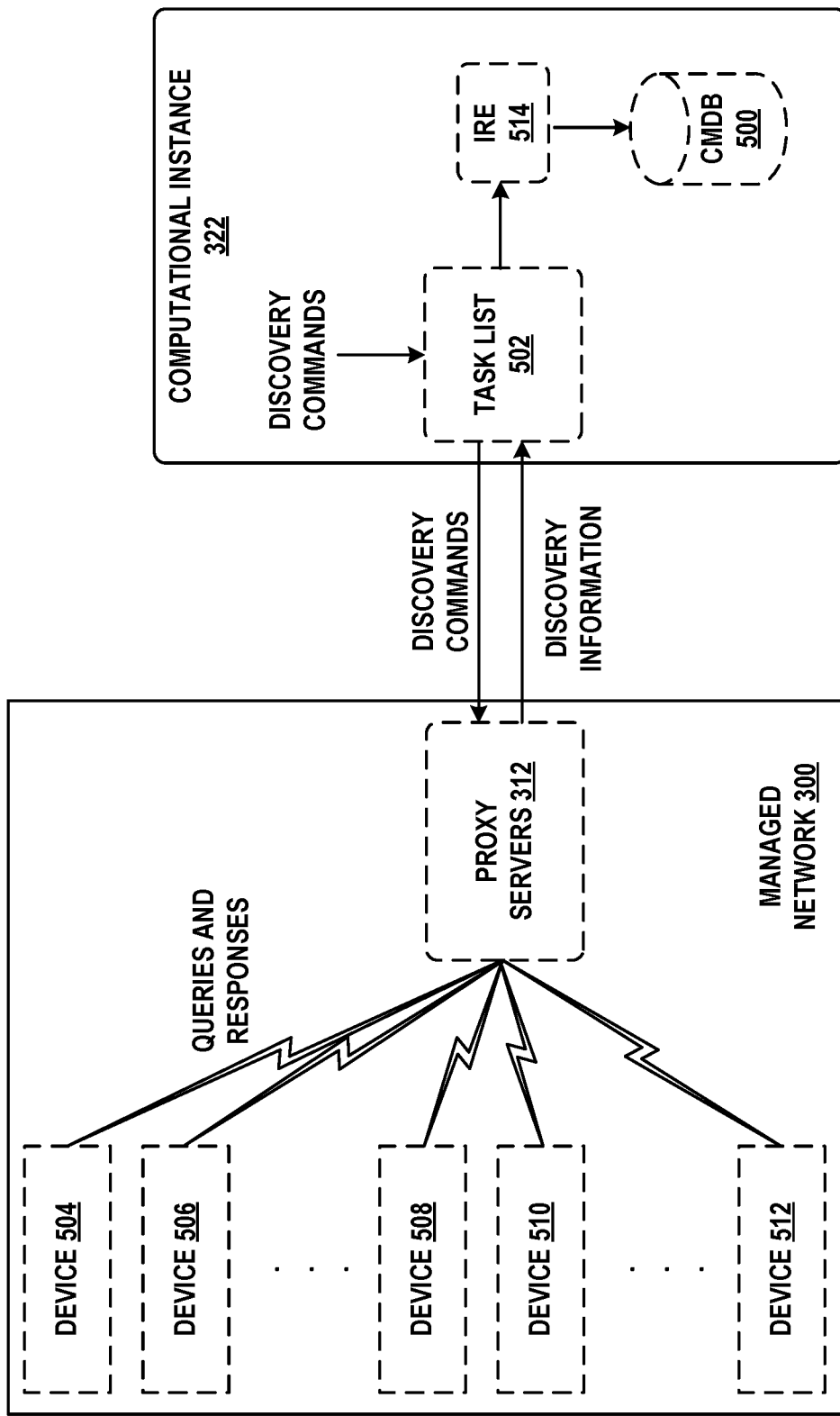
FIG. 5 depicts another communication environment involving a remote network management architecture, in accordance with example embodiments.

FIG. 5 provides a logical depiction of how configuration items and relationships can be discovered, as well as how information related thereto can be stored. For sake of simplicity, remote network management platform 320, public cloud networks 340, and Internet 350 are not shown.

In FIG. 5, CMDB 500, task list 502, and identification and reconciliation engine (IRE) 514 are disposed and/or operate within computational instance 322. Task list 502 represents a connection point between computational instance 322 and proxy servers 312. Task list 502 may be referred to as a queue, or more particularly as an external communication channel (ECC) queue. Task list 502 may represent not only the queue itself but any associated processing, such as adding, removing, and/or manipulating information in the queue.

As discovery takes place, computational instance 322 may store discovery tasks (jobs) that proxy servers 312 are to perform in task list 502, until proxy servers 312 request these tasks in batches of one or more. Placing the tasks in task list 502 may trigger or otherwise cause proxy servers 312 to begin their discovery operations. For example, proxy servers 312 may poll task list 502 periodically or from time to time, or may be notified of discovery commands in task list 502 in some other fashion. Alternatively or additionally, discovery may be manually triggered or automatically triggered based on triggering events (e.g., discovery may automatically begin once per day at a particular time).

Regardless, computational instance 322 may transmit these discovery commands to proxy servers 312 upon request. For example, proxy servers 312 may repeatedly query task list 502, obtain the next task therein, and perform this task until task list 502 is empty or another stopping condition has been reached. In response to receiving a discovery command, proxy servers 312 may query various devices, components, applications, and/or services in managed network 300 (represented for sake of simplicity in FIG. 5 by devices 504, 506, 508, 510, and 512). These devices, components, applications, and/or services may provide responses relating to their configuration, operation, and/or status to proxy servers 312. In turn, proxy servers 312 may then provide this discovered information to task list 502 (i.e., task list 502 may have an outgoing queue for holding discovery commands until requested by proxy servers 312 as well as an incoming queue for holding the discovery information until it is read).

IRE 514 may be a software module that removes discovery information from task list 502 and formulates this discovery information into configuration items (e.g., representing devices, components, applications, and/or services discovered on managed network 300) as well as relationships therebetween. Then, IRE 514 may provide these configuration items and relationships to CMDB 500 for storage therein. The operation of IRE 514 is described in more detail below.

In this fashion, configuration items stored in CMDB 500 represent the environment of managed network 300. As an example, these configuration items may represent a set of physical and/or virtual devices (e.g., client devices, server devices, routers, or virtual machines), applications executing thereon (e.g., web servers, email servers, databases, or storage arrays), as well as services that involve multiple individual configuration items. Relationships may be pairwise definitions of arrangements or dependencies between configuration items.

In order for discovery to take place in the manner described above, proxy servers 312, CMDB 500, and/or one or more credential stores may be configured with credentials for the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

There are two general types of discovery—horizontal and vertical (top-down). Each are discussed below.

A. Horizontal Discovery

Horizontal discovery is used to scan managed network 300, find devices, components, and/or applications, and then populate CMDB 500 with configuration items representing these devices, components, and/or applications. Horizontal discovery also creates relationships between the configuration items. For instance, this could be a "runs on" relationship between a configuration item representing a software application and a configuration item representing a server device on which it executes. Typically, horizontal discovery is not aware of services and does not create relationships between configuration items based on the services in which they operate.

There are two versions of horizontal discovery. One relies on probes and sensors, while the other also employs patterns. Probes and sensors may be scripts (e.g., written in JAVASCRIPT®) that collect and process discovery information on a device and then update CMDB 500 accordingly. More specifically, probes explore or investigate devices on managed network 300, and sensors parse the discovery information returned from the probes.

Patterns are also scripts that collect data on one or more devices, process it, and update the CMDB. Patterns differ from probes and sensors in that they are written in a specific discovery programming language and are used to conduct detailed discovery procedures on specific devices, components, and/or applications that often cannot be reliably discovered (or discovered at all) by more general probes and sensors. Particularly, patterns may specify a series of operations that define how to discover a particular arrangement of devices, components, and/or applications, what credentials to use, and which CMDB tables to populate with configuration items resulting from this discovery.

Both versions may proceed in four logical phases: scanning, classification, identification, and exploration. Also, both versions may require specification of one or more ranges of IP addresses on managed network 300 for which discovery is to take place. Each phase may involve communication between devices on managed network 300 and proxy servers 312, as well as between proxy servers 312 and task list 502. Some phases may involve storing partial or preliminary configuration items in CMDB 500, which may be updated in a later phase.

In the scanning phase, proxy servers 312 may probe each IP address in the specified range(s) of IP addresses for open Transmission Control Protocol (TCP) and/or User Datagram Protocol (UDP) ports to determine the general type of device and its operating system. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist.

In the classification phase, proxy servers 312 may further probe each discovered device to determine the type of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the specific type of operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise, if a device was classified as WINDOWS® 10, as a set of WINDOWS®-10-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address(es) assigned to these network interface(s), IP address(es) used by the particular device and so on. This identification information may be stored as one or more configuration items in CMDB 500 along with any relevant relationships therebetween. Doing so may involve passing the identification information through IRE 514 to avoid generation of duplicate configuration items, for purposes of disambiguation, and/or to determine the table(s) of CMDB 500 in which the discovery information should be written.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (software applications), and so on. Once more, the discovered information may be stored as one or more configuration items in CMDB 500, as well as relationships.

Running horizontal discovery on certain devices, such as switches and routers, may utilize SNMP. Instead of or in addition to determining a list of running processes or other application-related information, discovery may determine additional subnets known to a router and the operational state of the router's network interfaces (e.g., active, inactive, queue length, number of packets dropped, etc.). The IP addresses of the additional subnets may be candidates for further discovery procedures. Thus, horizontal discovery may progress iteratively or recursively.

Patterns are used only during the identification and exploration phases—under pattern-based discovery, the scanning and classification phases operate as they would if probes and sensors are used. After the classification stage completes, a pattern probe is specified as a probe to use during identification. Then, the pattern probe and the pattern that it specifies are launched.

Patterns support a number of features, by way of the discovery programming language, that are not available or difficult to achieve with discovery using probes and sensors. For example, discovery of devices, components, and/or applications in public cloud networks, as well as configuration file tracking, is much simpler to achieve using pattern-based discovery. Further, these patterns are more easily customized by users than probes and sensors. Additionally, patterns are more focused on specific devices, components, and/or applications and therefore may execute faster than the more general approaches used by probes and sensors.

Once horizontal discovery completes, a configuration item representation of each discovered device, component, and/or application is available in CMDB 500. For example, after discovery, operating system version, hardware configuration, and network configuration details for client devices, server devices, and routers in managed network 300, as well as applications executing thereon, may be stored as configuration items. This collected information may be presented to a user in various ways to allow the user to view the hardware composition and operational status of devices.

Furthermore, CMDB 500 may include entries regarding the relationships between configuration items. More specifically, suppose that a server device includes a number of hardware components (e.g., processors, memory, network interfaces, storage, and file systems), and has several software applications installed or executing thereon. Relationships between the components and the server device (e.g., "contained by" relationships) and relationships between the software applications and the server device (e.g., "runs on" relationships) may be represented as such in CMDB 500.

More generally, the relationship between a software configuration item installed or executing on a hardware configuration item may take various forms, such as "is hosted on", "runs on", or "depends on". Thus, a database application installed on a server device may have the relationship "is hosted on" with the server device to indicate that the database application is hosted on the server device. In some embodiments, the server device may have a reciprocal relationship of "used by" with the database application to indicate that the server device is used by the database application. These relationships may be automatically found using the discovery procedures described above, though it is possible to manually set relationships as well.

In this manner, remote network management platform 320 may discover and inventory the hardware and software deployed on and provided by managed network 300.

B. Vertical Discovery

Vertical discovery is a technique used to find and map configuration items that are part of an overall service, such as a web service. For example, vertical discovery can map a web service by showing the relationships between a web server application, a LINUX® server device, and a database that stores the data for the web service. Typically, horizontal discovery is run first to find configuration items and basic relationships therebetween, and then vertical discovery is run to establish the relationships between configuration items that make up a service.

Patterns can be used to discover certain types of services, as these patterns can be programmed to look for specific arrangements of hardware and software that fit a description of how the service is deployed. Alternatively or additionally, traffic analysis (e.g., examining network traffic between devices) can be used to facilitate vertical discovery. In some cases, the parameters of a service can be manually configured to assist vertical discovery.

In general, vertical discovery seeks to find specific types of relationships between devices, components, and/or applications. Some of these relationships may be inferred from configuration files. For example, the configuration file of a web server application can refer to the IP address and port number of a database on which it relies. Vertical discovery patterns can be programmed to look for such references and infer relationships therefrom. Relationships can also be inferred from traffic between devices—for instance, if there is a large extent of web traffic (e.g., TCP port 80 or 8080) traveling between a load balancer and a device hosting a web server, then the load balancer and the web server may have a relationship.

Relationships found by vertical discovery may take various forms. As an example, an email service may include an email server software configuration item and a database application software configuration item, each installed on different hardware device configuration items. The email service may have a "depends on" relationship with both of these software configuration items, while the software configuration items have a "used by" reciprocal relationship with the email service. Such services might not be able to be fully determined by horizontal discovery procedures, and instead may rely on vertical discovery and possibly some extent of manual configuration.

C. Advantages of Discovery

Regardless of how discovery information is obtained, it can be valuable for the operation of a managed network. Notably, IT personnel can quickly determine where certain software applications are deployed, and what configuration items make up a service. This allows for rapid pinpointing of root causes of service outages or degradation. For example, if two different services are suffering from slow response times, the CMDB can be queried (perhaps among other activities) to determine that the root cause is a database application that is used by both services having high processor utilization. Thus, IT personnel can address the database application rather than waste time considering the health and performance of other configuration items that make up the services.

In another example, suppose that a database application is executing on a server device, and that this database application is used by an employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular hardware device fails.

In general, configuration items and/or relationships between configuration items may be displayed on a web-based interface and represented in a hierarchical fashion. Modifications to such configuration items and/or relationships in the CMDB may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in a single operation.

V. CMDB Identification Rules and Reconciliation

A CMDB, such as CMDB 500, provides a repository of configuration items and relationships. When properly provisioned, it can take on a key role in higher-layer applications deployed within or involving a computational instance. These applications may relate to enterprise IT service management, operations management, asset management, configuration management, compliance, and so on.

For example, an IT service management application may use information in the CMDB to determine applications and services that may be impacted by a component (e.g., a server device) that has malfunctioned, crashed, or is heavily loaded. Likewise, an asset management application may use information in the CMDB to determine which hardware and/or software components are being used to support particular enterprise applications. As a consequence of the importance of the CMDB, it is desirable for the information stored therein to be accurate, consistent, and up to date.

A CMDB may be populated in various ways. As discussed above, a discovery procedure may automatically store information including configuration items and relationships in the CMDB. However, a CMDB can also be populated, as a whole or in part, by manual entry, configuration files, and third-party data sources. Given that multiple data sources may be able to update the CMDB at any time, it is possible that one data source may overwrite entries of another data source. Also, two data sources may each create slightly different entries for the same configuration item, resulting in a CMDB containing duplicate data. When either of these occurrences takes place, they can cause the health and utility of the CMDB to be reduced.

In order to mitigate this situation, these data sources might not write configuration items directly to the CMDB. Instead, they may write to an identification and reconciliation application programming interface (API) of IRE 514. Then, IRE 514 may use a set of configurable identification rules to uniquely identify configuration items and determine whether and how they are to be written to the CMDB.

In general, an identification rule specifies a set of configuration item attributes that can be used for this unique identification. Identification rules may also have priorities so that rules with higher priorities are considered before rules with lower priorities. Additionally, a rule may be independent, in that the rule identifies configuration items independently of other configuration items. Alternatively, the rule may be dependent, in that the rule first uses a metadata rule to identify a dependent configuration item.

Metadata rules describe which other configuration items are contained within a particular configuration item, or the host on which a particular configuration item is deployed. For example, a network directory service configuration item may contain a domain controller configuration item, while a web server application configuration item may be hosted on a server device configuration item.

A goal of each identification rule is to use a combination of attributes that can unambiguously distinguish a configuration item from all other configuration items, and is expected not to change during the lifetime of the configuration item. Some possible attributes for an example server device may include serial number, location, operating system, operating system version, memory capacity, and so on. If a rule specifies attributes that do not uniquely identify the configuration item, then multiple components may be represented as the same configuration item in the CMDB. Also, if a rule specifies attributes that change for a particular configuration item, duplicate configuration items may be created.

Thus, when a data source provides information regarding a configuration item to IRE 514, IRE 514 may attempt to match the information with one or more rules. If a match is found, the configuration item is written to the CMDB or updated if it already exists within the CMDB. If a match is not found, the configuration item may be held for further analysis.

Configuration item reconciliation procedures may be used to ensure that only authoritative data sources are allowed to overwrite configuration item data in the CMDB. This reconciliation may also be rules-based. For instance, a reconciliation rule may specify that a particular data source is authoritative for a particular configuration item type and set of attributes. Then, IRE 514 might only permit this authoritative data source to write to the particular configuration item, and writes from unauthorized data sources may be prevented. Thus, the authorized data source becomes the single source of truth regarding the particular configuration item. In some cases, an unauthorized data source may be allowed to write to a configuration item if it is creating the configuration item or the attributes to which it is writing are empty.

Additionally, multiple data sources may be authoritative for the same configuration item or attributes thereof. To avoid ambiguities, these data sources may be assigned precedences that are taken into account during the writing of configuration items. For example, a secondary authorized data source may be able to write to a configuration item's attribute until a primary authorized data source writes to this attribute. Afterward, further writes to the attribute by the secondary authorized data source may be prevented.

In some cases, duplicate configuration items may be automatically detected by IRE 514 or in another fashion. These configuration items may be deleted or flagged for manual de-duplication.

VI. Example Web Page with Runtime UI Component

A web page built using only static UI components might lack dynamic behavior that allows the web page to adapt its contents according to the context under which it is requested and/or rendered. Although dynamic behavior may be added to the web page by developing page-specific software, such an approach might not be accessible to users that are unfamiliar with the programming languages using which the page-specific software could be developed. Thus, low-code and/or no-code users might be limited to developing web pages using only static UI components that are deployable using template-based web page editors. Additionally, developing page-specific software might not be quickly and/or easily scalable across multiple web pages, since the same software might not be reusable across the multiple web pages. Accordingly, provided herein is a low-code and/or no-code architecture that allows dynamic behavior to be added to web pages in a scalable manner using UI templates.

Figure 6:
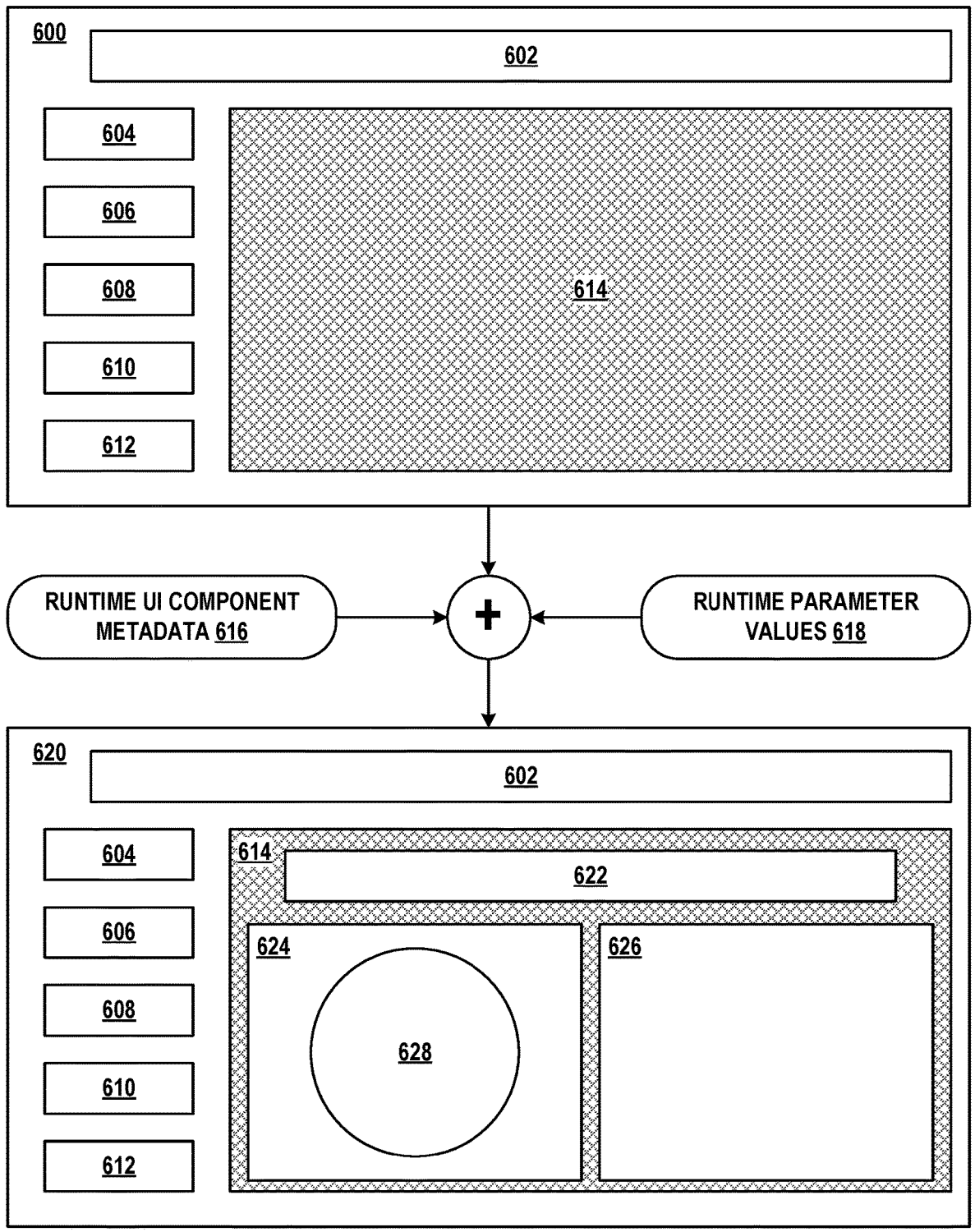
FIG. 6 depicts a web page, in accordance with example embodiments.

FIG. 6 illustrates an example web page 600 that includes a plurality of UI components. Specifically, web page 600 may include static UI components 602, 604, 606, 608, 610, and 612 (i.e., static UI components 602-612). Web page 600 may also include runtime UI component 614. Static UI components 602-612 may generally appear and/or behave in the same or similar manner across different renderings of web page 600. Runtime UI component 614 may be configured to allow at least part of web page 600 to be populated with context-specific UI components generated based on runtime parameter values, thereby allowing for generation of context-specific webpages, such as context-specific web page 620.

Although some of static UI component 602-612 may be used to display user-specific data, the positioning, visual appearance, and/or behavior of static UI components may generally remain consistent over time. For example, static UI components 602-612 may be included in every rendering of web page 600 in substantially the same spatial arrangement, may provide substantially the same behavior, may have substantially the same appearance, and may display request-specific data. Static UI components 602-612 may be predefined using a template-based web page editor. Thus, the positioning, visual appearance, and/or behavior of static UI components 602-612 may be changed using the template-based web page editor at design time, but such properties of static UI components 602-612 might not be modifiable at runtime. Static UI components 602-612 may, for example, define a menu structure of web page 600, provide links to other web pages, display corresponding data, and/or otherwise provide at least some of the functionality of web page 600.

Runtime UI component 614 may be configured to reserve an empty portion of web page 600. The contents of runtime UI component may be determined at runtime based on metadata that indicates how the empty portion is to be populated with context-specific UI components. Thus, without metadata to define the runtime contents thereof, runtime UI component 614 may remain empty. Accordingly, runtime UI component 614 may be used with, for example, runtime UI component metadata 616, which may indicate how runtime UI component 614 is to be populated based on a plurality of possible runtime parameter values. Runtime UI component metadata 616 may include a mapping between the plurality of possible runtime parameter values and corresponding context-specific UI components.

For example, runtime UI component metadata 616 may indicate that, when a request for web page 600 is associated with runtime parameter values 618, context-specific web page 620 is to be generated. In context-specific web page 620, the empty portion reserved by runtime UI component 614 has been populated with context-specific UI components 622, 624, 626, and 628 (i.e., context-specific UI components 622-628). Context-specific web page 620 represents one context-specific version of web page 600 that results from runtime UI component metadata 616 being evaluated based on runtime parameter values 618.

Runtime UI component metadata 616 may indicate that, when a plurality of parameters associated with a request for web page 600 have runtime parameter values 618, context-specific UI components 622-628 are to be generated to populate the empty area designated by runtime UI component 614. Runtime UI component metadata 616 may also specify one or more other possible context-specific versions of web page 600, each of which may be conditioned upon a corresponding combination of one or more runtime parameter values. Thus, different runtime parameter values and/or different runtime UI component metadata may result in different context-specific versions of web page 600.

Each respective context-specific UI component of context-specific UI components 622-628 may be based on a corresponding UI component template. The corresponding UI component template may be modified based on runtime UI component metadata 616 and/or runtime parameter values 618 so that the respective context-specific UI component reflects the circumstances under which web page 600 is being accessed. Runtime parameter values 618 may include parameter values that are specific to a user requesting web page 600/620, parameter values that are specific to a client device using which web page 600/620 is being accessed, and/or parameter values that are specific to a server device that is hosting web page 600/620. Thus, context-specific web page 620 may be user-specific, client-specific, and/or server-specific.

Further, since the context-specific UI components 622-628 are determined at runtime, design of web page 600 may be decoupled from the runtime contents thereof. That is, rather than populating runtime UI component 614 with static UI components that remain constant across different renderings of web page 600, runtime UI component 614 may instead be defined at design time and executed at runtime to generate context-dependent versions of web page 600 (e.g., web page 620). Additionally, once runtime UI component metadata 616 has been defined, the same or similar behavior may be added to other instances of runtime UI component 614 in other web pages by adding runtime UI component metadata 616 to the other instances of runtime UI component 614.

Figure 7:
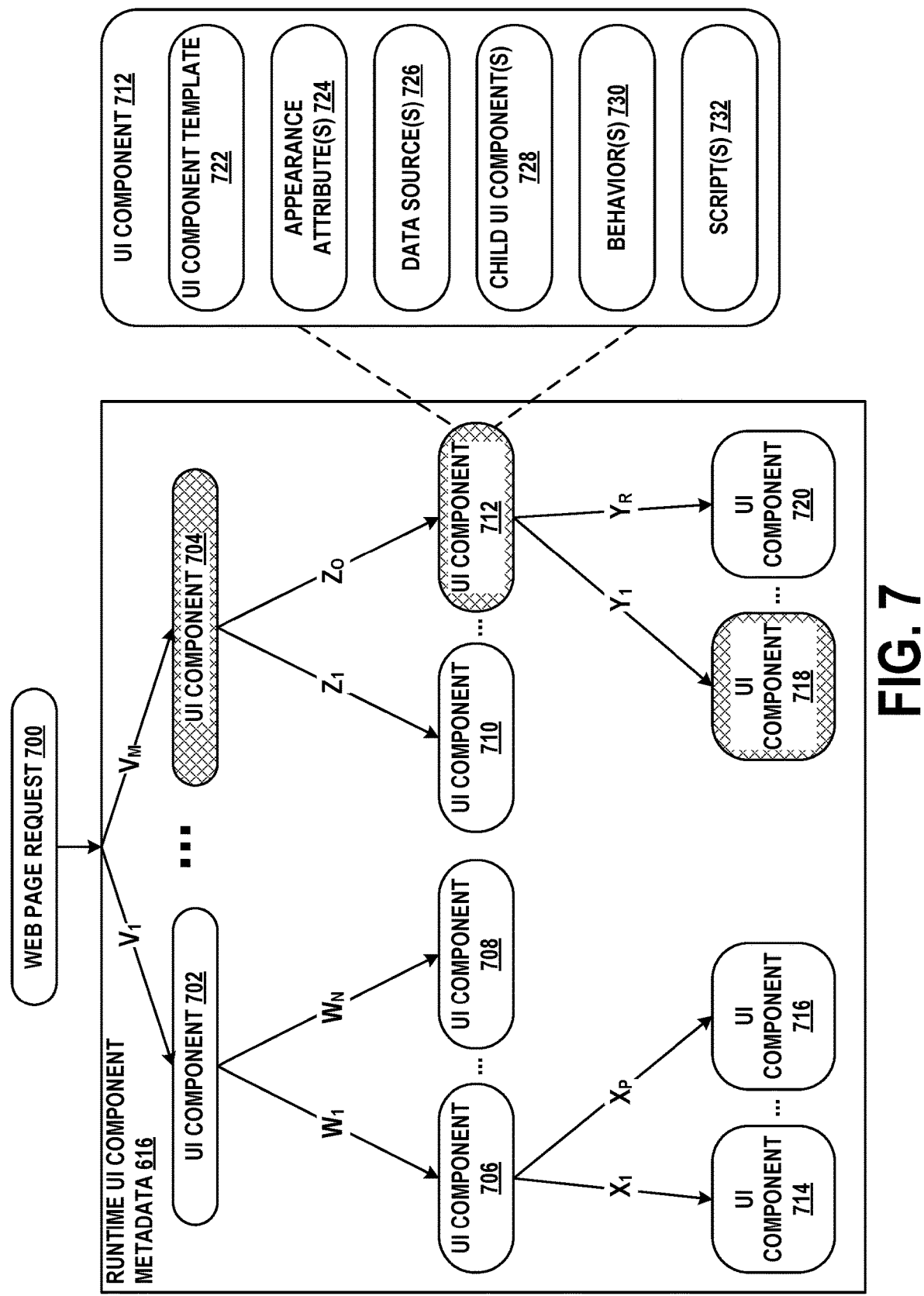
FIG. 7 depicts UI component metadata, in accordance with example embodiments.

FIG. 7 illustrates a graphical representation of runtime UI component metadata 616, which may be referred to simply as metadata 616. Metadata 616 may be expressed using JAVASCRIPT® Object Notation (JSON), XML, and/or YAML, among other possibilities. Metadata 616 may define one or more hierarchies that indicate different possible arrangements of a plurality of UI components that could be generated at runtime. The hierarchies may be organized and/or visualized as a tree, as shown in FIG. 7. Web page request 700 may be associated with a plurality of runtime parameter values (e.g., runtime parameter values 618), which may be used in combination with metadata 616 to select a subset of the UI components specified by metadata 616 to be included in a context-specific webpage that is responsive to web page request 700.

Specifically, when the plurality of runtime parameter values includes parameter value $V_1$, UI component 702 may be included in the context-specific web page. When the plurality of runtime parameter values includes parameter value $V_M$, UI component 704 may be included in the context-specific web page. Other UI components, as indicated by the ellipsis between UI components 702 and 704, may be included in the context-specific web page when the plurality of runtime parameter values includes corresponding parameter values.

In some implementations, parameter values $V_1$-$V_M$ (as well as the other sets of parameter values shown in FIG. 7) may each correspond to different parameters, and multiple ones of parameter values $V_1$-$V_M$ may thus be present in association with any given instantiation of web page request 700 (i.e., parameter values $V_1$-$V_M$ are not mutually exclusive). Thus, the UI components at a particular level of the tree might not be mutually exclusive. For example, the empty portion of the web page may include both UI component 702 and UI component 704, each of which may be used to populate a different region of the empty portion.

If the context-specific web page includes UI component 702, UI components 706 and 708 may be included in the context-specific web page when the plurality of runtime parameter values includes parameter value Wi and parameter value $W_N$, respectively. UI components 706 and 708 may be children of UI component 702. A first UI component that is a child of a second UI component may be spatially arranged within an area of the UI defined by the second UI component. Other UI components, as indicated by the ellipsis between UI components 706 and 708, may be included in the context-specific web page as children of UI component 702 when the plurality of runtime parameter values includes corresponding parameter values (not shown).

If the context-specific web page includes UI component 704, UI components 710 and 712 may be included in the context-specific web page when the plurality of runtime parameter values includes parameter value $Z_1$ and parameter value $Z_O$, respectively. UI components 710 and 712 may be children of UI component 704. Other UI components, as indicated by the ellipsis between UI components 710 and 712, may be included in the context-specific web page as children of UI component 704 when the plurality of runtime parameter values includes corresponding parameter values (not shown).

If the context-specific web page includes UI component 706, UI components 714 and 716 may be included in the context-specific web page when the plurality of runtime parameter values includes parameter value Xi and parameter value XP, respectively. UI components 714 and 716 may be children of UI component 706. Other UI components, as indicated by the ellipsis between UI components 714 and 716, may be included in the context-specific web page as children of UI component 706 when the plurality of runtime parameter values includes corresponding parameter values (not shown). Similarly, other UI components (not shown) may be included in the context-specific web page as children of UI component 708 when the plurality of runtime parameter values includes corresponding parameter values (not shown).

If the context-specific web page includes UI component 712, UI components 718 and 720 may be included in the context-specific web page when the plurality of runtime parameter values includes parameter value $Y_1$ and parameter value $Y_R$, respectively. UI components 718 and 720 may be children of UI component 712. Other UI components, as indicated by the ellipsis between UI components 718 and 720, may be included in the context-specific web page as children of UI component 712 when the plurality of runtime parameter values includes corresponding parameter values (not shown). Similarly, other UI components (not shown) may be included in the context-specific web page as children of UI component 710 when the plurality of runtime parameter values includes corresponding parameter values (not shown).

As one example, when parameter values $V_M$, $Z_O$, and $Y_1$ are determined at runtime based on request 700, the empty portion of the web page may be populated with UI components 704, 712, and 718, as indicated by the hatched pattern thereof, organized according to the hierarchy shown in FIG. 7. Thus, UI components 704, 712, and 718 are an example of context-specific UI components corresponding to request 700.

An example of the metadata that defines UI components 702-720 is illustrated by the enlarged version of UI component 712 provided on the right side of FIG. 7. Specifically, the metadata associated with UI component 712 may include UI component template 722, appearance attribute(s) 724, data source(s) 726, child UI component(s) 728, behavior(s) 730, and script(s) 732.

UI template 722 may identify a predefined UI component template to be used in generating UI component 712. A UI template may alternatively be referred to as a content block. Thus, UI template 722 may specify a type of UI component 712, and may include, for example, one or more of a card, a list, a graph, a table, a text field, a modal window, a drop-down menu, and/or an overlay, among other possibilities. The predefined UI component template may include one or more default values that define, among other aspects, an appearance, behavior, and/or data sources of UI components based thereon. These default values may be overridden by a developer at web page design time and/or at runtime based on one or more parameter values. Thus, appearance attribute(s) 724, data source(s) 726, child UI component(s) 728, behavior(s) 730, and/or script(s) 732 may have the default values specified by UI component template 722, modified values specified at web page design time, and/or modified values determined at runtime.

Appearance attribute(s) 724 may define a visual appearance of UI component 712. Appearance attribute(s) 724 may include color attribute(s), size attribute(s), and/or layout attribute(s), among other possible attributes that control how UI component 712 appears as part of a web page. Appearance attribute(s) 724 may be conditioned on one or more runtime parameter values. Thus, appearance attribute(s) 724 may define a plurality of candidate visual appearances of UI component 712, and a particular subset of the plurality of candidate visual appearances may be selected at runtime based on runtime parameter values.

Data source(s) 726 may indicate one or more sources from which data is to be obtained to populate UI component 712. For example, data source(s) 726 may include a database, an application programming interface (API), one or more filed, and/or a machine learning model configured to provide data for UI component 712. In some cases, data source(s) 726 may indicate, for each portion of UI component 712 that is configured to display data, one or more corresponding sources from which to obtain the data. Data source(s) 726 may be conditioned on one or more runtime parameter values. Thus, data source(s) 726 may define a plurality of candidate sources of data for UI component 712, and a particular subset of these candidate sources of data may be selected at runtime based on runtime parameter values.

Child UI component(s) 728 may include one or more child components that could be included within an area of the UI defined by UI component 712 as a subset thereof. For example, child UI component(s) 728 of UI component 712 may include UI components 718-720. Child UI component(s) 728 may be conditioned on one or more runtime parameter values. Thus, child UI component(s) 728 may define a plurality of candidate child UI components (e.g., 718-720) of UI component 712, and a particular subset (e.g., UI component 718) of the plurality of candidate child UI components may be selected at runtime based on runtime parameter values.

Each of UI components 718-720 (and the other UI components identified by metadata 616) may also include a corresponding set of child UI components. Thus, the parent-child relationships specified by metadata 616 for each UI component may specify a plurality of possible runtime hierarchies of UI components (and thus of UI component templates). Since the parent-child relationships may be conditioned on the runtime parameter values, one or more of these hierarchies may be selected at runtime based on the runtime parameter values.

Behavior(s) 730 may define how UI component 712 responds to one or more possible user interactions with UI component 712. For example, behavior(s) 730 may indicate which parts of UI component 712 are selectable and/or interactive (e.g., clickable) and/or what action is performed in response to selection of selectable/interactive parts of UI component 712. Behavior(s) 730 may include, for example, a client-side modification to UI component 712 and/or a call to a server device, among other possibilities. Behavior(s) 730 may be conditioned on one or more runtime parameter values. Thus, behavior(s) 730 may define a plurality of candidate behaviors of UI component 712, and a particular subset of the plurality of candidate behaviors may be selected at runtime based on runtime parameter values.

Script(s) 732 may include instructions executable at runtime by a server device and/or a client device. Script(s) 732 may be configured to implement and/or modify aspects of UI component 712, including appearance attribute(s) 724, data source(s) 726, child UI component(s) 728, and/or behavior(s) 730. For example, script(s) 732 may be included as part of the representation of the web page, and may be executed by the client device to, based on and/or in response to user interactions with UI component 712, modify an appearance of UI component 712, retrieve and/or modify data provided by UI component 712, and/or cause UI component 712 to trigger execution of one or more operations.

Figure 8A:
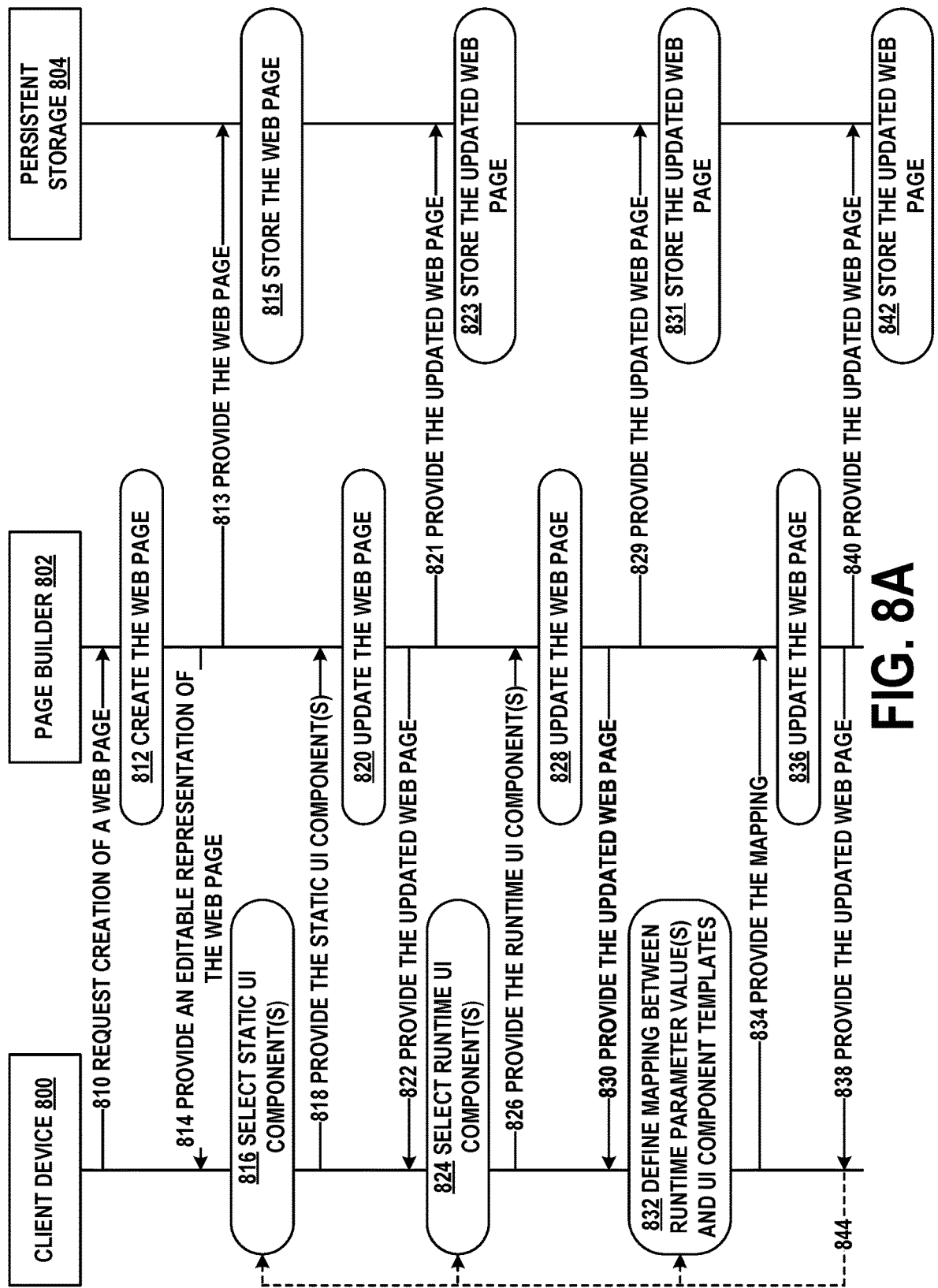
FIGS. 8A, 8B, 8C depict a message flow diagram, in accordance with example embodiments.

Runtime UI component metadata may be defined and edited using a runtime UI component editor, which may be provided as part of a page builder application (e.g., page builder 802, as shown in and discussed with respect to FIG. 8A). The runtime UI component editor may be configured to provide a visual representation of editable/modifiable values of metadata 616. In some cases, the runtime UI component editor may be configured to hide and/or protect from modification non-editable/non-modifiable values of metadata 616. For example, the runtime UI component editor may present the editable metadata values using a table and/or a list, rather than as textual program code, thus allowing low-code/no-code developers to quickly and easily modify the metadata. The table and/or list may include, for each editable value of the metadata, a plurality of predefined valid values that are expected to result in non-erroneous operation of the resulting web page.

For example, each of appearance attribute(s) 724, data source(s) 726, child UI component(s) 728, behavior(s) 730, and/or script(s) 732 may include one or more editable values and one or more non-editable values. Each component template on which a UI component is based may indicate whether a metadata value associated with the UI component template is editable or non-editable. A metadata value may be designated as editable when, for example, an erroneous value thereof is unlikely to interfere with operation of a resulting web page, and could thus be altered by a low-code/no-code developer without significant risk of breaking the resulting web page. On the other hand, a metadata value may be designated as non-editable when, for example, an erroneous value thereof is likely to interfere with operation of the resulting web page and thus, if erroneously altered and/or selected by a low-code/no-code developer, might pose a significant risk of breaking the resulting web page. Whether a metadata value is editable or non-editable might be determined by a developer of the UI template who is familiar with the intended behavior of the UI template.

By explicitly separating editable and non-editable aspects of metadata 616, low-code/no-code developers may be allowed to build web pages with dynamic behavior without needing to learn and/or master any programming languages and/or without running a significant risk of developing error-prone web pages. Further, by presenting the editable metadata values using a table or other graphical representation, rather than as textual program code, low-code/no-code developers may be able to quickly and easily modify the metadata without needing to view and/or understand the underlying program code. Yet further, by providing predetermined valid metadata values for selection by the low-code/no-code developer (rather than allowing for unbounded selection), the likelihood of generating a web page that contains errors may be further reduced.

Additionally, since the runtime UI component reserves a designated portion of the web page, any errors that might be introduced into the web page by context-specific UI components defined by the low-code/no-code developer may remain localized to the designated portion. Thus at least the static UI components of the web page may continue to function correctly when the metadata defining the runtime UI component includes an error.

VII. Example Web Page Definition and Runtime Generation Operations

Figure 8B:
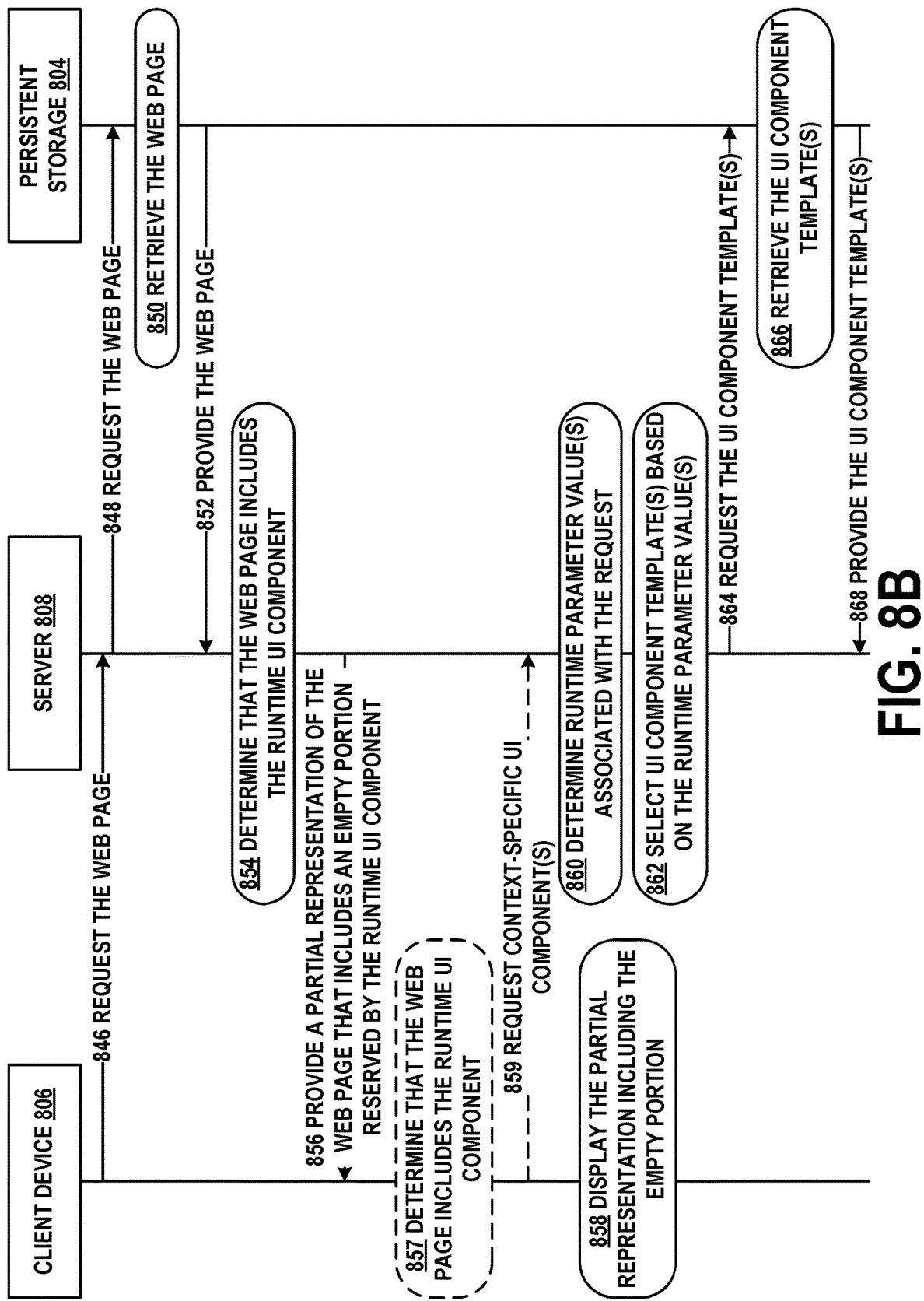
Figure 8C:
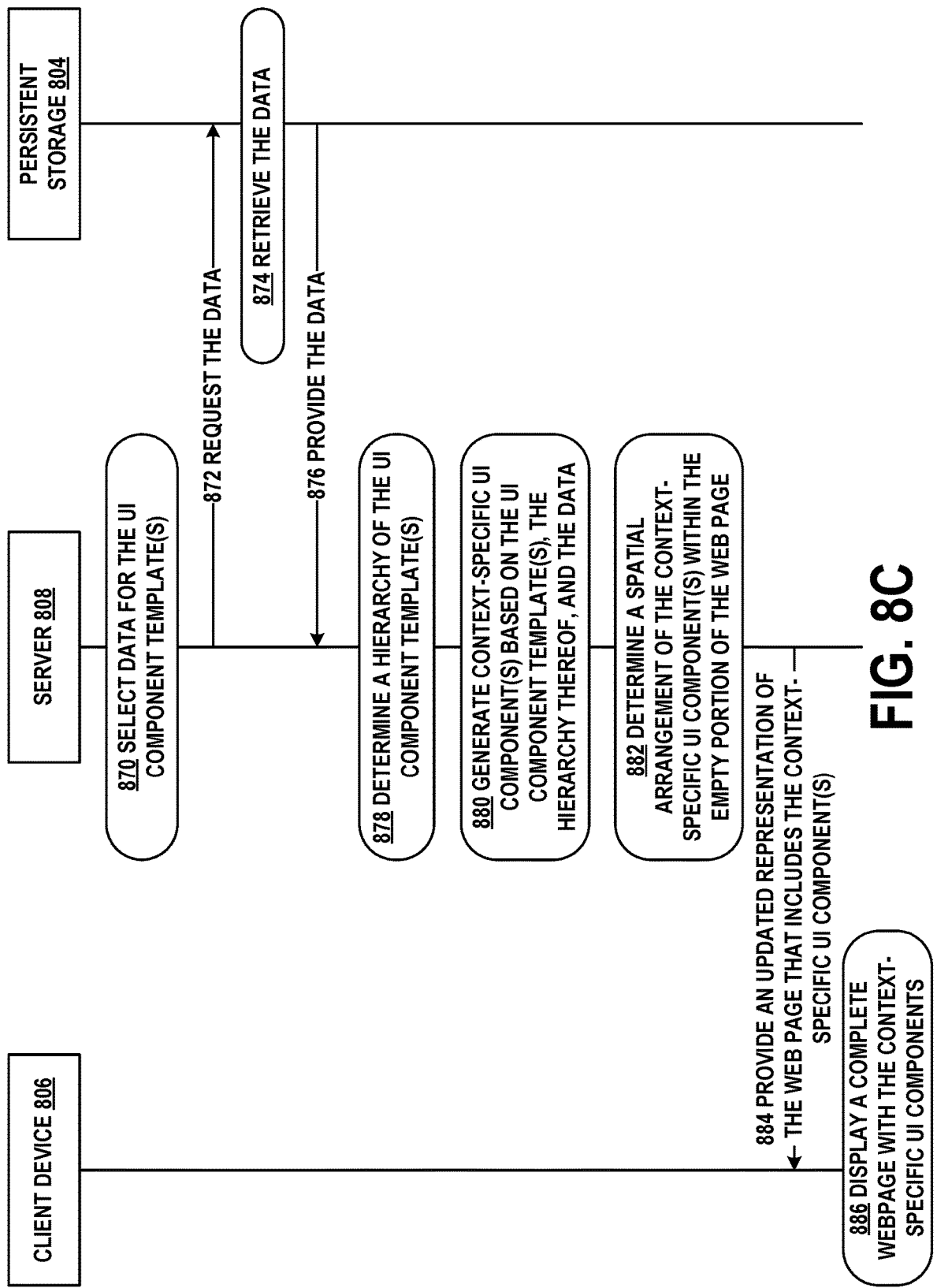

FIG. 8A illustrates a message flow diagram of example operations that may be carried out by client device 800, page builder 802, and persistent storage 804 in connection with definition of a web page. FIGS. 8B and 8C illustrate message flow diagrams of example operations that may be carried out by client device 806, server 808, and persistent storage 804 in connection with runtime generation of the web page.

Each of client devices 800 and 806 may be a user device, such as a desktop computer, tablet computer, smartphone, and/or other computing device, through which a user (e.g., a low-code/no-code developer) may interact with a UI, resources provided by page builder 802, and/or resources provided by server 808. Client devices 800 and/or 806 may, for example, be disposed within managed network 300. Client devices 800 and/or 806 may be configured to receive user input, and may be configured to perform the operations described herein based on the user input. While client device 800 is shown defining the web page, and client device 806 is shown accessing the web page, either client device may be usable to define and/or access the web page.

Page builder 802 may include one or more applications configured to provide one or more UIs configured to facilitate definition of one or more web pages. Server 808 may include one or more applications configured to communicate with client devices 800 and/or 806 and facilitate provision of the one or more web pages. Persistent storage 804 may be configured to store the one or more web pages, UI component templates, and/or data used to populate the one or more web pages, among other data. In some implementations, page builder 802, server 808, and/or persistent storage 804 may be disposed within computational instance 322 or another computational instance of remote network management platform 320. Persistent storage 804 may represent and/or include, for example, CMDB 500 or some other database.

Client device 800 may be configured to transmit, to page builder 802, a request for creation of a web page, as indicated by arrow 810. The request for creation of the web page may include, for example, a desired URL for the web page, a name of the web page, and/or a selection of computing resources for hosting the web page, among other possible information. Page builder 802 may provide client device 800 with a user interface that lists a plurality of attributes of the web page for which a user could specify values.

Based on and/or in response to reception of the request at arrow 810, page builder 802 may be configured to create the web page, as indicated by block 812. Creation of the web page may involve, for example, defining of a blank canvas for the web page and allocating computing resources to serve the web page. Creation of the web page may be automated, such that low-code/no-code developers are able to deploy the web page using the user interface provided by page builder 802 and without needing to manually perform any deployment operations.

Based on and/or in response to creation of the web page, page builder 802 may be configured to provide, to client device 800, an editable representation of the web page, as indicate by arrow 814. The editable representation of the web page may include a user interface that allows client device 800 to be used to add static UI components and runtime UI components to the web page. The user interface may display a plurality of possible static UI components and the runtime UI components, and each may be repositionable to a corresponding portion of the blank canvas to be added to the web page.

Based on and/or in response to creation of the web page at block 812, page builder 802 may also be configured to provide the web page to persistent storage 804, as indicated by arrow 813. Based on and/or in response to reception of the web page at arrow 813, persistent storage 804 may be configured to store the web page, as indicated by block 815.

Accordingly, based on and/or in response to reception of the editable representation of the web page at arrow 814, client device 800 may be used to select static UI component(s) to be included in the web page, as indicated by block 816. Each static UI component may be placed at a corresponding location within the web page, and a visual appearance and data content thereof may be defined.

Based on and/or in response to selection of the static UI component(s) at block 816, client device 800 may be configured to provide, to page builder 802, the static UI component(s), as indicated by arrow 818. Based on and/or in response to reception of the static UI component(s) at arrow 818, page builder 802 may be configured to update the web page, as indicated by block 820. Updating the web page may involve generating instructions that implement the static UI component(s) as selected at block 816. Based on and/or in response to updating the web page at block 820, page builder 802 may be configured to provide, to client device 800, an editable representation of the updated web page, as indicated by arrow 822.

Based on and/or in response to updating the web page at block 820, page builder 802 may also be configured to provide the updated web page to persistent storage 804, as indicated by arrow 821. Based on and/or in response to reception of the updated web page at arrow 821, persistent storage 804 may be configured to store the updated web page, as indicated by block 823.

Based on and/or in response to reception of the editable representation of the updated web page at arrow 822 and/or reception of the editable representation of the web page at arrow 814, client device 800 may be used to select runtime UI component(s), as indicated by block 824. Selection of the runtime UI component(s) may involve defining one or more portions of the web page to be occupied by context-specific UI components generated at runtime, rather than static UI components specified at design time (e.g., at block 816). The runtime UI component(s) may appear blank until the runtime behavior thereof is defined. Thus, the runtime UI component(s) may reserve respective empty portions of the web page to be populated by context-specific UI components based on runtime parameter values.

Based on and/or in response to selection of the runtime UI component(s) at block 824, client device 800 may be configured to provide, to page builder 802, the runtime UI component(s), as indicated by arrow 826. Based on and/or in response to reception of the runtime UI component(s) at arrow 826, page builder 802 may be configured to update the web page, as indicated by block 828. Based on and/or in response to updating the web page at block 828, page builder

802 may be configured to provide, to client device 800, the updated web page, as indicated by arrow 830.

Based on and/or in response to updating the web page at block 828, page builder 802 may also be configured to provide the updated web page to persistent storage 804, as indicated by arrow 829. Based on and/or in response to reception of the updated web page at arrow 829, persistent storage 804 may be configured to store the updated web page, as indicated by block 831.

Based on and/or in response to reception of the updated web page at arrow 830, client device 800 may be used to define a mapping between runtime parameter value(s), UI component templates, and/or attributes of UI components resulting from the UI component templates, as indicated by block 832. Defining the mapping may involve selecting one or more UI component templates that could be included in the web page and, for each respective UI component template of the one or more UI component templates, specifying one or more runtime parameter values that cause the respective UI component template to the included as part of the web page. Defining the mapping may also include conditioning one or more properties of the resulting UI component on one or more other runtime parameter values. For example, defining the mapping may involve specifying runtime parameter-based conditions for any one of the properties of a UI component, as illustrated by the example of UI component 712 in FIG. 7.

The mapping may be specified by way of a runtime UI component editor provided by page builder 802 as part of the editable representation of the web page. The runtime UI component editor may allow the mapping to be implemented by modifying editable parts of the metadata associated with each UI component template. The runtime UI component editor may hide and/or protect non-editable parts of the metadata associated with each UI component, thus reducing and/or eliminating the possibility of generating mappings that result in runtime errors.

In some implementations, the runtime UI component editor may be configured to automatically generate, for each editable part of the metadata, a scripting variable representing that part of the metadata, so that a low-code user could quickly and easily write a script that utilizes and/or modifies the editable part of the metadata represented by the scripting variable. For example, variables representing editable parts of the metadata may be generated as part of one or more comments, and may thus be inactive by default. Accordingly, when a low-code user determines to employ one or more of these variables, the low-code user may remove the comment marker from the one or more variables, and may add instructions that utilize these one or more variables, thereby defining context-specific operation and/or appearance of the resulting UI components.

Based on and/or in response to definition of the mapping at block 832, client device 800 may be configured to provide the mapping to page builder 802, as indicated by arrow 834. Based on and/or in response to reception of the mapping at arrow 834, page builder 802 may be configured to update the web page, as indicated by block 836. Based on and/or in response to updating the web page at block 836, page builder 802 may be configured to provide an editable representation of the updated web page to client device 800, as indicated by arrow 838.

Based on and/or in response to reception of the editable representation of the updated web page at arrow 838, client device may be used to repeat the operations of block 816, block 824, and/or block 832 to define other aspects of the web page, as indicated by arrow 844. For example, the editable representation of the web page may be used to add further static UI components and/or runtime UI components to the webpage, and/or update the mapping to define desired runtime behavior.

Based on and/or in response to updating the web page at block 836, page builder 802 may also be configured to provide the updated web page to persistent storage 804, as indicated by arrow 840. Based on and/or in response to reception of the updated web page at arrow 840, persistent storage 804 may be configured to store the updated web page, as indicated by block 842.

Turning to FIG. 8B, client device 806 may be configured to transmit, to server 808, a request for the web page, as indicated by arrow 846. Based on and/or in response to reception of the request at arrow 846, server 808 may be configured to provide, to persistent storage 804, a request for the web page, as indicated by arrow 848. Based on and/or in response to reception of the request at arrow 848, persistent storage 804 may be configured to retrieve the web page, as indicated by block 850. Based on and/or in response to retrieving the web page at block 850, persistent storage 804 may be configured to provide the web page to server 808, as indicated by arrow 852.

Based on and/or in response to reception of the web page at arrow 852, server 808 may be configured to determine that the web page includes the runtime UI component, as indicated by block 854. Specifically, server 808 may determine that, rather than including predefined UI components, the runtime UI component includes metadata that defines parameters for which server 808 is to determine parameter values, and subsequently use these parameter values, in combination with conditions defined in the metadata, to generate context-specific UI components. Because determining the parameter values may include transmitting additional communications to client device 806, persistent storage 804, and/or other computing resources (e.g., a machine learning model), server 808 may be configured to generate a partial representation of the web page prior to generating the context-specific UI components based on the metadata and the runtime parameter values.

Accordingly, in some implementations, based on and/or in response to determining that the web page includes the runtime UI component, server 808 may be configured to transmit, to client device 806, a partial representation of the web page that includes an empty portion reserved by the runtime UI component, as indicated by arrow 856. Based on and/or in response to reception of the partial representation of the web page at arrow 856, client device 806 may be configured to display (or at least begin the rendering of) the partial representation, including the empty portion, as indicated by block 858. Alternatively, in other implementations, server 808 may wait to respond to the request at arrow 846 until a complete web page has been generated.

The empty portion may reserve a region of the web page, as defined at block 824, to be populated by context-specific UI components. In some implementations, the empty portion may include an icon, an animation, or other visual representation indicating that rendering of the empty portion has not been completed. The partial representation of the web page, as displayed by client device 806, may be navigable and/or usable prior to reception of the context-specific UI components. For example, a user may be able to view and/or interact with any of the static UI components included in the partial representation of the web page. Thus, by providing the partial representation to client device 806, the web page may appear more responsive than if server 808 waited until the complete web page is ready before responding to the request of arrow 846.

In some implementations, based on and/or in response to reception of the partial representation of the web page at arrow 856, client device 806 may be configured to determine that the web page includes the runtime UI component, as indicated by block 857. Determining that the web page includes the runtime UI component may involve determining that the partial representation of the web page is incomplete, and thus that an additional request is to be transmitted by client device 806 to obtain context-specific UI components to populate the empty portion.

Accordingly, based on and/or in response to determining, at block 857, that the web page includes the runtime UI component, client device 806 may be configured to transmit, to server 808, a request for context-specific UI component(s), as indicated by arrow 859. The request at arrow 859 may be, for example, an XMLHttpRequest (XHR) request. In some implementations, the request at arrow 859 may include one or more parameter values to be used in generating the context-specific UI component(s).

In some implementations, client device 806 may be configured to omit the operations of block 857 and arrow 859 (as indicated by the dashed lines thereof), and may instead wait for server 808 to provide zero or more additional responses containing the context-specific UI component(s). The operations of block 857 and/or arrow 859 may be performed before the operations of block 858, as shown in FIG. 8B, and/or after the operations of block 858.

Additionally, based on and/or in response to determining, at block 854, that the web page includes the runtime UI component and/or reception of the request at arrow 859, server 808 may be configured to determine runtime parameter value(s) associated with the request received at arrow 846, as indicated by block 860. Specifically, the runtime parameter value(s) may correspond to one or more parameters indicated by the metadata of the runtime UI component. That is, the metadata of the runtime UI component may inform server 808 of the parameters for which corresponding values are to be determined. Accordingly, based on reception of the runtime UI component, which includes the metadata defining the runtime behavior thereof, server 808 may be configured to obtain the runtime parameter value(s) from client device 806, persistent storage 804, and/or another computing resource.

In some cases, the runtime parameter values may include user-specific parameter values such as a user identifier (e.g., name, email, username, etc.), user history (e.g., browsing history, purchase history, history of context-specific UI components viewed as part of prior web pages, etc.), user connections (e.g., the user's friends, co-workers, etc.), and/or user preferences, among other possibilities. The runtime parameter values may also include device-specific parameter values such as a device name, device location, device usage history, device hardware, and/or device software, among other possibilities. The runtime parameter values may further include server-specific parameter values such as server location, server hardware, server software, other web pages provided by the server, and/or a server workload, among other possibilities.

Based on and/or in response to determination of the runtime parameter value(s) at block 860, server 808 may be configured to select UI component template(s) based on the runtime parameter value(s), as indicated by block 862. Based on and/or in response to selection of the UI component template(s) at block 862, server 808 may be configured to request, from persistent storage 804, the UI component template(s), as indicated by arrow 864. Specifically, the mapping and/or hierarchy indicated by the metadata of the runtime UI component may specify the UI templates corresponding to the runtime parameter values determined at block 860.

Based on and/or in response to reception of the request at arrow 864, persistent storage 804 may be configured to retrieve the UI component template(s), as indicated by block 866. Based on and/or in response to retrieving the UI component template(s) at block 866, persistent storage 804 may be configured to provide the UI component template(s) to server 808, as indicated by arrow 868.

Turning to FIG. 8C, based on and/or in response to reception of the UI component templates at arrow 868, server 808 may be configured to select data for the UI component template(s), as indicated by block 870. Specifically, the data for the UI component template(s) may be selected based on (i) the fields present within the UI component template(s) and (ii) an indication in the metadata of the runtime UI component of how these fields are to be populated in view of the runtime parameter values. For example, each field of a UI component template may be filled with one or more pieces of information, depending on the runtime parameter values.

Based on and/or in response to selection of the data at block 870, server 808 may be configured to provide to persistent storage 804 a request for the data, as indicated by arrow 872. Based on and/or in response to reception of the request at arrow 872, persistent storage 804 may be configured to retrieve the data, as indicated by block 874. Based on and/or in response to retrieving the data at block 874, persistent storage 804 may be configured to provide the data to server 808, as indicated by arrow 876.

Based on and/or in response to reception of the data at block 878, server 808 may be configured to determine a hierarchy of the UI component template(s), as indicated by block 878. For example, server 808 may be configured to organize the UI component templates selected at block 862 into a hierarchy similar to that shown in FIG. 7. For example, the UI component templates selected at block 862 may be organized as a set (selected based on a first group of one or more parameter values), and block 878 may involve transforming (based on a second group of one or more runtime parameter values) the set into a tree that represents elements of the set as nodes of the tree, thereby defining a spatial arrangement of the set within the web page. Thus, determining the hierarchy may involve arranging one or more child components as subsets of a corresponding parent component.

Based on and/or in response to determining the hierarchy at block 878, server 808 may be configured to generate context-specific UI component(s) based on the UI component template(s), the hierarchy thereof, and the data, as indicated by block 880. Generating the context-specific UI components may involve populating the UI components with the data selected at block 870, arranging the UI components into the hierarchy determined at block 870, and/or adjusting other properties of the UI component templates, as indicated by the metadata and the runtime parameter values.

Based on and/or in response to generation of the context-specific UI component(s) at block 880, server 808 may be configured to determine a spatial arrangement of the context-specific UI components within the empty portion of the web page, as indicated by block 882. Determining the spatial arrangement of the context-specific UI component may involve adjusting a size of each context-specific UI component to fit the data to be displayed thereby, and adjusting a size of each parent component to fit therein the child components thereof. Depending on the area occupied by the context-specific UI components, scrolling and/or pagination may be added to the runtime UI component in order to fit the context-specific UI components within the empty portion of the web page reserved/designated by the runtime UI component.

Based on and/or in response to determination of the spatial arrangement at block 882, server 808 may be configured to provide, to client device 806, an updated representation of the web page that includes the context-specific UI component(s), as indicated by arrow 884. The partial representation of the webpage provided at arrow 856 and the updated representation of the web page provided at arrow 884 may collectively form a context-specific representation of the web page. Based on and/or in response to reception of the updated representation of the web page at arrow 884, client device 806 may be configured to display a complete representation of the web page that includes the empty portion populated with the context-specific UI components, as indicated by block 886.

The complete representation of the web page may allow a user of client device 806 to interact with each of the context-specific UI components, and may continue to display each of the static UI components included in the partial representation of the web page. One or more of the context-specific UI components may include client-executable scripts, as specified by the runtime UI component metadata, that allow the context-specific UI components to respond to user inputs (e.g., without obtaining an updated version of the web page from server 808).

VIII. Example Operations

Figure 9:
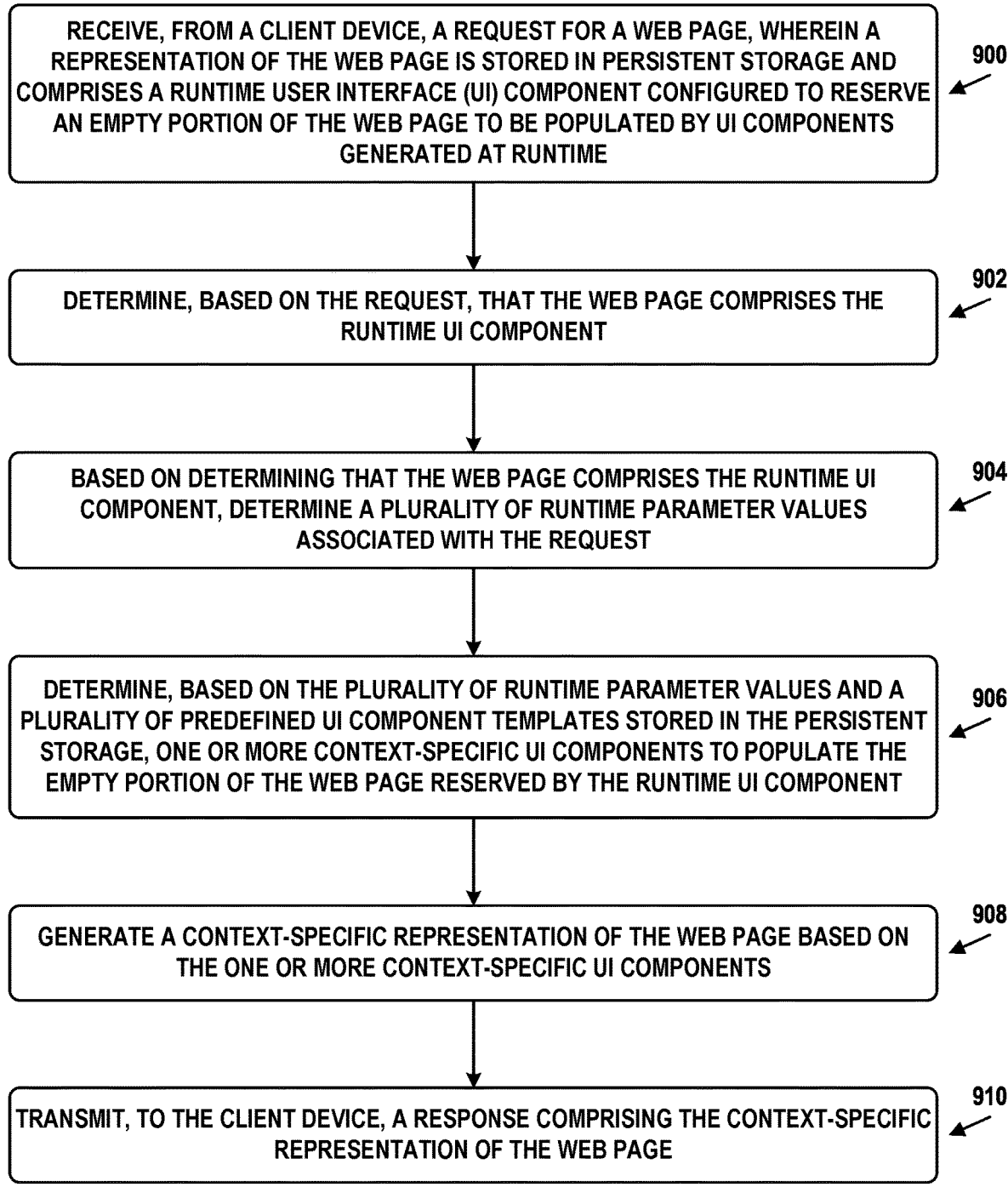
FIG. 9 is a flow chart, in accordance with example embodiments.

FIG. 9 is a flow chart illustrating an example embodiment. The process illustrated by FIG. 9 may be carried out by a computing device, such as computing device 100, and/or a cluster of computing devices, such as server cluster 200. However, the process can be carried out by other types of devices or device subsystems. For example, the process could be carried out by a computational instance of a remote network management platform, a portable computer, such as a laptop or a tablet device, page builder 802, client device 800, client device 806, and/or server 808.

The embodiments of FIG. 9 may be simplified by the removal of any one or more of the features shown therein. Further, these embodiments may be combined with features, aspects, and/or implementations of any of the previous figures or otherwise described herein.

Block 900 may involve receiving, from a client device, a request for a web page. A representation of the web page may be stored in persistent storage and may include a runtime UI component configured to reserve an empty portion of the web page to be populated by UI components generated at runtime.

Block 902 may involve determining, based on the request, that the web page includes the runtime UI component.

Block 904 may involve, based on determining that the web page includes the runtime UI component, determining a plurality of runtime parameter values associated with the request.

Block 906 may involve determining, based on the plurality of runtime parameter values and a plurality of predefined UI component templates stored in the persistent storage, one or more context-specific UI components to populate the empty portion of the web page reserved by the runtime UI component.

Block 908 may involve generating a context-specific representation of the web page based on the one or more context-specific UI components.

Block 910 may involve transmitting, to the client device, a response that includes the context-specific representation of the web page.

In some embodiments, the runtime UI component may include a mapping between (i) a plurality of possible runtime parameter values and (ii) the plurality of predefined UI component templates. Determining the one or more context-specific UI components may include selecting, from the plurality of predefined UI component templates, UI component templates that the mapping indicates correspond to the plurality of runtime parameter values of the plurality of possible runtime parameter values. Determining the one or more context-specific UI components may also include updating one or more fields of the selected UI component templates based on data responsive to the request.

In some embodiments, the one or more context-specific UI components may include a plurality of context-specific UI components. The mapping of the runtime UI component may indicate a plurality of possible hierarchies in which the plurality of predefined UI component templates are to be arranged to populate the empty portion of the web page. Determining the plurality of context-specific UI components may include generating, based on the mapping and the runtime parameter values, a representation of a runtime hierarchy of the selected UI component templates. The context-specific representation of the web page may include the plurality of context-specific UI components spatially arranged within the empty portion of the web page according to the runtime hierarchy.

In some embodiments, the plurality of runtime parameter values may represent a web page sequence of one or more web pages viewed using the client device prior to reception of the request for the web page. Determining the one or more context-specific UI components may include determining the one or more context-specific UI components based on the web page sequence. Different web page sequences viewed using the client device prior to reception of the request for the web page may cause determination of different pluralities of context-specific UI components.

In some embodiments, determining the one or more context-specific UI components based on the web page sequence may include determining, based on the web page sequence, one or more previously-viewed context-specific UI components that have been displayed using a previous instantiation of the runtime UI component as part of the one or more web pages. The one or more context-specific UI components may be determined based on the one or more previously-viewed context-specific UI components.

In some embodiments, determining the one or more context-specific UI components may include providing (i) metadata associated with the runtime UI component and (ii) the plurality of runtime parameter values as input to a machine learning model that has been trained to generate content for context-specific UI components. Determining the one or more context-specific UI components may also include obtaining, from the machine learning model, a first content for at least one context-specific UI component of the one or more context-specific UI components.

In some embodiments, the web page may also include a static UI component configured to populate a corresponding portion of the web page independently of the runtime parameter values.

In some embodiments, based on determining that the web page includes the runtime UI component, a partial representation of the web page may be generated. The partial representation may include (i) the static UI component and (ii) the empty portion reserved by the runtime UI component. Before determining the one or more context-specific UI components, a partial response including the partial representation of the web page may be transmitted to the client device. Reception of the partial response may be configured to cause the client device to display a partial rendering of the web page that includes the static UI component and the empty portion. Reception of the response including the context-specific representation of the web page may be configured to cause the client device to display a complete rendering of the web page that includes the empty portion replaced by the one or more context-specific UI components.

In some embodiments, determining the one or more context-specific UI components may include executing a script contained in a respective context-specific UI component of the one or more context-specific UI components. Execution of the script may be configured to obtain context-specific data that corresponds to the plurality of runtime parameter values and is responsive to the request. The context-specific representation of the web page may be generated based on the context-specific data.

In some embodiments, determining the one or more context-specific UI components may include executing a script contained in a respective context-specific UI component of the one or more context-specific UI components. Execution of the script may be configured to modify, based on the plurality of runtime parameter values, one or more properties of a corresponding UI component template on which the respective context-specific UI component is based. The context-specific representation of the web page may be generated based on the one or more properties as modified by the execution of the script.

In some embodiments, determining that the web page includes the runtime UI component may include determining that the web page includes a plurality of instantiations of the runtime UI component. Each respective instantiation of the runtime UI component of the plurality of instantiations may be configured to reserve a corresponding empty portion of the web page to be populated by corresponding UI components generated at runtime. Determining the one or more context-specific UI components may include obtaining, for each respective instantiation of the runtime UI component of the plurality of instantiations, corresponding metadata that defines a runtime behavior of the respective instantiation of the runtime UI component. Determining the one or more context-specific UI components may also include determining, for each respective runtime component of the plurality of instantiations and based on (i) the plurality of runtime parameter values and (ii) the corresponding metadata, corresponding one or more context-specific UI components to populate the corresponding empty portion of the web page.

In some embodiments, the plurality of runtime parameter values may include one or more of: (i) a parameter value associated with a user of the client device, (ii) a parameter value associated with the client device, or (iii) a parameter value associated with a server device that received the request for the web page.

In some embodiments, generating the context-specific representation of the web page may include determining an area occupied by the one or more context-specific UI components, and adjusting a size of the empty portion of the web page based on the area to fit the one or more context-specific UI components.

In some embodiments, the runtime UI component may be generated by a process that includes selecting, from the plurality of predefined UI component templates, a particular UI component template, and displaying, by way of a runtime UI component editor, a visual representation of modifiable values of metadata that defines the particular UI component template. The process of generating the runtime UI component may also include receiving, by way of the runtime UI component editor, a modification of one or more of the modifiable values of the metadata.

In some embodiments, receiving the modification of one or more of the modifiable values of the metadata may include receiving a definition of a condition under which the UI component template is to be included in the empty portion of the web page. The condition may identify a particular runtime parameter value that triggers inclusion of the UI component template in the empty portion of the web page.

IX. Closing

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid-state drive, or another storage medium.

The computer readable medium can also include non-transitory computer readable media such as non-transitory computer readable media that store data for short periods of time like register memory and processor cache. The non-transitory computer readable media can further include non-transitory computer readable media that store program code and/or data for longer periods of time. Thus, the non-transitory computer readable media may include secondary or persistent long-term storage, like ROM, optical or magnetic disks, solid-state drives, or compact disc read only memory (CD-ROM), for example. The non-transitory computer readable media can also be any other volatile or non-volatile storage systems. A non-transitory computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments could include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A system comprising:
   persistent storage containing (i) a plurality of predefined user interface (UI) component templates and (ii) a representation of a web page that comprises a runtime UI component configured to reserve an empty portion of the web page to be populated by UI components generated at runtime, wherein the runtime UI component is associated with a mapping between a plurality of possible runtime parameter values and the plurality of predefined UI component templates; and
   one or more processors configured to perform operations comprising:
      receiving, from a client device, a request for the web page;
      determining, based on the request, that the web page comprises the runtime UI component;
      based on determining that the web page comprises the runtime UI component, determining a plurality of runtime parameter values associated with the request;
      determining, based on the plurality of runtime parameter values and the plurality of predefined UI component templates, one or more context-specific UI components to populate the empty portion of the web page reserved by the runtime UI component, wherein determining the one or more context-specific UI components comprises (i) selecting, from the plurality of predefined UI component templates, UI component templates that the mapping indicates correspond to the plurality of runtime parameter values and (ii) updating one or more fields of the selected UI component templates based on data responsive to the request;
      generating a context-specific representation of the web page based on the one or more context-specific UI components; and
      transmitting, to the client device, a response comprising the context-specific representation of the web page.

2. The system of claim 1, wherein the one or more context-specific UI components comprise a plurality of context-specific UI components, wherein the mapping of the runtime UI component indicates a plurality of possible hierarchies in which the plurality of predefined UI component templates are to be arranged to populate the empty portion of the web page, and wherein determining the plurality of context-specific UI components comprises:
   generating, based on the mapping and the plurality of runtime parameter values, a representation of a runtime hierarchy of the selected UI component templates, wherein the context-specific representation of the web page comprises the plurality of context-specific UI components spatially arranged within the empty portion of the web page according to the runtime hierarchy.

3. The system of claim 1, wherein the plurality of runtime parameter values represent a web page sequence of one or more web pages viewed using the client device prior to reception of the request for the web page, and wherein determining the one or more context-specific UI components comprises:
   determining the one or more context-specific UI components based on the web page sequence, wherein different web page sequences viewed using the client device prior to reception of the request for the web page cause determination of different pluralities of context-specific UI components.

4. The system of claim 3, wherein determining the one or more context-specific UI components based on the web page sequence comprises:
   determining, based on the web page sequence, one or more previously-viewed context-specific UI components that have been displayed using a previous instantiation of the runtime UI component as part of the one or more web pages; and
   determining the one or more context-specific UI components based on the one or more previously-viewed context-specific UI components.

5. The system of claim 1, wherein determining the one or more context-specific UI components comprises:
   providing (i) metadata associated with the runtime UI component and (ii) the plurality of runtime parameter values as input to a machine learning model that has been trained to generate content for context-specific UI components; and
   obtaining, from the machine learning model, a first content for at least one context-specific UI component of the one or more context-specific UI components.

6. The system of claim 1, wherein the web page further comprises a static UI component configured to populate a corresponding portion of the web page independently of the plurality of runtime parameter values.

7. The system of claim 6, wherein the operations further comprise:
based on determining that the web page comprises the runtime UI component, generating a partial representation of the web page, wherein the partial representation comprises (i) the static UI component and (ii) the empty portion reserved by the runtime UI component; and
before determining the one or more context-specific UI components, transmitting, to the client device, a partial response comprising the partial representation of the web page, wherein reception of the partial response is configured to cause the client device to display a partial rendering of the web page comprising the static UI component and the empty portion, and wherein reception of the response comprising the context-specific representation of the web page is configured to cause the client device to display a complete rendering of the web page that includes the empty portion replaced by the one or more context-specific UI components.

8. The system of claim 1, wherein determining the one or more context-specific UI components comprises:
executing a script contained in a respective context-specific UI component of the one or more context-specific UI components, wherein execution of the script is configured to obtain context-specific data that corresponds to the plurality of runtime parameter values and is responsive to the request, and wherein the context-specific representation of the web page is generated based on the context-specific data.

9. The system of claim 1, wherein determining the one or more context-specific UI components comprises:
executing a script contained in a respective context-specific UI component of the one or more context-specific UI components, wherein execution of the script is configured to modify, based on the plurality of runtime parameter values, one or more properties of a corresponding UI component template on which the respective context-specific UI component is based, and wherein the context-specific representation of the web page is generated based on the one or more properties as modified by the execution of the script.

10. The system of claim 1, wherein:
determining that the web page comprises the runtime UI component comprises determining that the web page comprises a plurality of instantiations of the runtime UI component;
each respective instantiation of the runtime UI component of the plurality of instantiations is configured to reserve a corresponding empty portion of the web page to be populated by corresponding UI components generated at runtime; and
determining the one or more context-specific UI components comprises:
obtaining, for each respective instantiation of the runtime UI component of the plurality of instantiations, corresponding metadata that defines a runtime behavior of the respective instantiation of the runtime UI component; and
determining, for each respective instantiation of the runtime UI component of the plurality of instantiations and based on (i) the plurality of runtime parameter values and (ii) the corresponding metadata, corresponding one or more context-specific UI components to populate the corresponding empty portion of the web page.

11. The system of claim 1, wherein the plurality of runtime parameter values comprises one or more of: (i) a parameter value associated with a user of the client device, (ii) a parameter value associated with the client device, or (iii) a parameter value associated with a server device that received the request for the web page.

12. The system of claim 1, wherein generating the context-specific representation of the web page comprises:
determining an area occupied by the one or more context-specific UI components; and
adjusting a size of the empty portion of the web page based on the area to fit the one or more context-specific UI components.

13. The system of claim 1, wherein the runtime UI component is generated by a process comprising:
selecting, from the plurality of predefined UI component templates, a particular UI component template;
displaying, by way of a runtime UI component editor, a visual representation of modifiable values of metadata that defines the particular UI component template; and
receiving, by way of the runtime UI component editor, a modification of one or more of the modifiable values of the metadata.

14. The system of claim 13, wherein receiving the modification comprises:
receiving a definition of a condition under which the particular UI component template is to be included in the empty portion of the web page, wherein the condition identifies a particular runtime parameter value that triggers inclusion of the particular UI component template in the empty portion of the web page.

15. A method comprising:
receiving, from a client device, a request for a web page, wherein a representation of the web page is stored in persistent storage and comprises a runtime user interface (UI) component configured to reserve an empty portion of the web page to be populated by UI components generated at runtime, and wherein the runtime UI component is associated with a mapping between a plurality of possible runtime parameter values and a plurality of predefined UI component templates stored in the persistent storage;
determining, based on the request, that the web page comprises the runtime UI component;
based on determining that the web page comprises the runtime UI component, determining a plurality of runtime parameter values associated with the request;
determining, based on the plurality of runtime parameter values and the plurality of predefined UI component templates, one or more context-specific UI components to populate the empty portion of the web page reserved by the runtime UI component, wherein determining the one or more context-specific UI components comprises (i) selecting, from the plurality of predefined UI component templates, UI component templates that the mapping indicates correspond to the plurality of runtime parameter values and (ii) updating one or more fields of the selected UI component templates based on data responsive to the request;
generating a context-specific representation of the web page based on the one or more context-specific UI components; and
transmitting, to the client device, a response comprising the context-specific representation of the web page.

16. The method of claim 15, wherein the one or more context-specific UI components comprise a plurality of context-specific UI components, wherein the mapping of the runtime UI component indicates a plurality of possible hierarchies in which the plurality of predefined UI component templates are to be arranged to populate the empty portion of the web page, and wherein determining the plurality of context-specific UI components comprises:

generating, based on the mapping and the plurality of runtime parameter values, a representation of a runtime hierarchy of the selected UI component templates, wherein the context-specific representation of the web page comprises the plurality of context-specific UI components spatially arranged within the empty portion of the web page according to the runtime hierarchy.

17. The method of claim 15, wherein the web page further comprises a static UI component configured to populate a corresponding portion of the web page independently of the plurality of runtime parameter values, and wherein the method further comprises:

based on determining that the web page comprises the runtime UI component, generating a partial representation of the web page, wherein the partial representation comprises (i) the static UI component and (ii) the empty portion reserved by the runtime UI component; and before determining the one or more context-specific UI components, transmitting, to the client device, a partial response comprising the partial representation of the web page, wherein reception of the partial response is configured to cause the client device to display a partial rendering of the web page comprising the static UI component and the empty portion, and wherein reception of the response comprising the context-specific representation of the web page is configured to cause the client device to display a complete rendering of the web page that includes the empty portion replaced by the one or more context-specific UI components.

18. The method of claim 15, wherein the plurality of runtime parameter values represent a web page sequence of one or more web pages viewed using the client device prior to reception of the request for the web page, and wherein determining the one or more context-specific UI components comprises:

determining the one or more context-specific UI components based on the web page sequence, wherein different web page sequences viewed using the client device prior to reception of the request for the web page cause determination of different pluralities of context-specific UI components.

19. The method of claim 15, wherein determining the one or more context-specific UI components comprises:

providing (i) metadata associated with the runtime UI component and (ii) the plurality of runtime parameter values as input to a machine learning model that has been trained to generate content for context-specific UI components; and obtaining, from the machine learning model, a first content for at least one context-specific UI component of the one or more context-specific UI components.

20. An article of manufacture including a non-transitory computer-readable medium, having stored thereon program instructions that, upon execution by a computing system, cause the computing system to perform operations comprising:

receiving, from a client device, a request for a web page, wherein a representation of the web page is stored in persistent storage and comprises a runtime user interface (UI) component configured to reserve an empty portion of the web page to be populated by UI components generated at runtime, and wherein the runtime UI component is associated with a mapping between a plurality of possible runtime parameter values and a plurality of predefined UI component templates stored in the persistent storage;

determining, based on the request, that the web page comprises the runtime UI component;

based on determining that the web page comprises the runtime UI component, determining a plurality of runtime parameter values associated with the request;

determining, based on the plurality of runtime parameter values and the plurality of predefined UI component templates, one or more context-specific UI components to populate the empty portion of the web page reserved by the runtime UI component, wherein determining the one or more context-specific UI components comprises (i) selecting, from the plurality of predefined UI component templates, UI component templates that the mapping indicates correspond to the plurality of runtime parameter values and (ii) updating one or more fields of the selected UI component templates based on data responsive to the request;

generating a context-specific representation of the web page based on the one or more context-specific UI components; and transmitting, to the client device, a response comprising the context-specific representation of the web page.

* * * * *